(12) United States Patent
Yoshimi et al.

(10) Patent No.: US 9,221,469 B2
(45) Date of Patent: Dec. 29, 2015

(54) VEHICLE HEIGHT ESTIMATION DEVICE AND VEHICLE HEIGHT ESTIMATION METHOD

(75) Inventors: Tsuyoshi Yoshimi, Susono (JP); Shingo Koumura, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/378,467

(22) PCT Filed: Feb. 16, 2012

(86) PCT No.: PCT/JP2012/053726
§ 371 (c)(1),
(2), (4) Date: Aug. 13, 2014

(87) PCT Pub. No.: WO2013/121569
PCT Pub. Date: Aug. 22, 2013

(65) Prior Publication Data
US 2015/0046033 A1    Feb. 12, 2015

(51) Int. Cl.
*B60G 17/018* (2006.01)
*B60W 40/12* (2012.01)
*B60G 17/015* (2006.01)
*G01B 21/02* (2006.01)
*G01P 3/00* (2006.01)

(52) U.S. Cl.
CPC .............. *B60W 40/12* (2013.01); *B60G 17/015* (2013.01); *B60G 17/018* (2013.01); *G01B 21/02* (2013.01); *G01P 3/00* (2013.01); *B60G 2400/202* (2013.01); *B60G 2400/25* (2013.01)

(58) Field of Classification Search
CPC ........... B60G 17/0165; B60G 2500/30; B60G 2400/25; B60G 2400/82; B60G 2400/204

USPC .................................................... 701/37, 31.4
See application file for complete search history.

(56) References Cited

U.S. PATENT DOCUMENTS 4,813,705 A * 3/1989 Hagen et al. ................ 280/5.517
5,347,457 A * 9/1994 Tanaka et al. .................... 701/37
(Continued)

FOREIGN PATENT DOCUMENTS

| JP | 6-48139 | 2/1994 |
|---|---|---|
| JP | 2005-225339 | 8/2005 |
| JP | 2010-188801 | 9/2010 |

OTHER PUBLICATIONS

International Search Report issued Apr. 3, 2012, in PCT/JP12/053726 filed Feb. 16, 2012.

*Primary Examiner* — Redhwan k Mawari
(74) *Attorney, Agent, or Firm* — Oblon, McClelland, Maier & Neustadt, L.L.P.

(57) ABSTRACT

The height of a vehicle can be estimated inexpensively by: detecting a wheel speed, which is a speed of each wheel; performing frequency analysis of the detected wheel speed of a pair of left and right wheels and calculating respective wheel speed characteristics of the left and right wheels at a gain-specific frequency; calculating a left-right wheel speed gain difference on the basis of the calculated wheel speed characteristics of the left and right wheels; and estimating the vehicle height on the basis of a corresponding relationship between a wheel height of the wheel with respect to a vehicle body and a value (wheel speed/road surface input gain) that is based on wheel speed and a road surface input that is inputted from the road surface to the wheels, and on the basis of the left-right wheel speed gain difference.

6 Claims, 16 Drawing Sheets

(56) References Cited

U.S. PATENT DOCUMENTS

| | | | |
|---|---|---|---|
| 5,406,486 A * | 4/1995 | Kamio et al. | 701/84 |
| 5,497,325 A * | 3/1996 | Mine | 701/38 |
| 2002/0002427 A1* | 1/2002 | Ishida et al. | 701/1 |
| 2009/0062985 A1* | 3/2009 | Ohashi et al. | 701/37 |
| 2009/0254250 A1* | 10/2009 | Koo | 701/38 |
| 2010/0305841 A1* | 12/2010 | Kajima et al. | 701/124 |
| 2011/0015844 A1* | 1/2011 | Perkins et al. | 701/69 |
| 2014/0195112 A1* | 7/2014 | Lu et al. | 701/37 |
| 2015/0088378 A1* | 3/2015 | Sugai et al. | 701/37 |

* cited by examiner

VEHICLE HEIGHT ESTIMATION DEVICE AND VEHICLE HEIGHT ESTIMATION METHOD

TECHNICAL FIELD

The invention relates to a vehicle height estimation device and a vehicle height estimation method for estimating the height of a vehicle.

BACKGROUND ART

Conventionally, the height of a vehicle varies depending on, for instance, a boarding state in terms, among other factors, of the number of occupants and the amount of cargo load, if any, in the vehicle. Changes in vehicle height are determined by changes in wheel height of the wheels with respect to the body. Therefore, vehicle height has been conventionally detected on the basis of the actual vehicle height, using vehicle height sensors that detect wheel height.

Patent document 1: Japanese Patent Application Publication No. 2005-225339

SUMMARY OF THE INVENTION

In vehicles equipped with an antilock brake system (ABS), the braking force generated by a brake device corresponding to a respective wheel is preferably controlled in accordance with a left-right load difference or a front-rear load difference of the vehicle. In the absence of a load sensor that detects directly the load state of the vehicle, the latter can be conceivably determined on the basis of the vehicle height of the vehicle. A plurality of vehicle height sensors is therefore required in such a case, which may result in a greater cost per vehicle. Accordingly, there is a demand for a scheme in which the height of a vehicle can be estimated on the basis of input values from existing sensors.

In the light of the above, therefore, it is an object of the invention to provide a vehicle height estimation device and a vehicle height estimation method that allow estimating the height of a vehicle inexpensively.

In order to solve the above problems, a vehicle height estimation device according to the invention is provided with: wheel speed detection means for detecting a wheel speed, which is a speed of each wheel; and vehicle height estimation means for estimating a vehicle height on the basis of a corresponding relationship between a wheel height of the wheel with respect to a vehicle body and a value that is based on the wheel speed and a road surface input that is inputted from a road surface to the wheel, and on the basis of the detected wheel speed of a pair of wheels.

In the vehicle height estimation device, preferably, the vehicle height estimation means performs frequency analysis of the detected wheel speed of a pair of left and right wheels and calculates respective wheel speed characteristics of the left and right wheels at a gain-specific frequency; and estimates, as the vehicle height, a relative height of one of the left and right wheels with respect to the other one of the left and right wheels on the basis of a left-right wheel speed gain difference, which is a difference between the calculated wheel speed characteristics, and a relationship, which is the corresponding relationship, between the wheel height and an actual wheel speed gain that is based on the road surface input and the wheel speed at the gain-specific frequency.

Preferably, the vehicle height estimation device is further provided with vehicle speed detection means for detecting a vehicle speed of the vehicle; and the vehicle height estimation means performs frequency analysis of the detected wheel speed of a pair of front and rear wheels and calculates a front and rear wheel phase difference at a phase-specific frequency; calculates, on the basis of the detected vehicle speed, an input phase difference, which is a phase difference between inputs of the front wheel and the rear wheel; and calculates, as the vehicle height, a wheel height of the rear wheel on the basis of the calculated front and rear wheel phase difference, the input phase difference, and a relationship, which is the corresponding relationship, between the wheel height and an actual wheel speed phase that is based on the road surface input and the wheel speed at the phase-specific frequency.

Preferably, the vehicle height estimation device is further provided with a suspension state modification device that modifies a suspension state of each wheel with respect to the vehicle body; the corresponding relationship is different depending on the suspension state of each wheel; and the vehicle height estimation means estimates the vehicle height on the basis of the corresponding relationship according to the suspension state.

In order to solve the above problems, a vehicle height estimation method according to the invention includes: a step of detecting a wheel speed, which is a speed of each wheel; and a step of estimating a vehicle height on the basis of a corresponding relationship between a wheel height of the wheel with respect to a vehicle body and a value that is based on the wheel speed and a road surface input that is inputted from a road surface to the wheel, and on the basis of the detected wheel speed of a pair of wheels.

Preferably, the vehicle height estimation method further includes a step of performing frequency analysis of the detected wheel speed of a pair of left and right wheels and calculating respective wheel speed characteristics of the left and right wheels at a gain-specific frequency; and the step of estimating the vehicle height includes estimating, as the vehicle height, a relative height of one of the left and right wheels with respect to the other one of the left and right wheels on the basis of a left-right wheel speed gain difference, which is a difference between the calculated wheel speed characteristics, and a relationship, which is the corresponding relationship, between the wheel height and an actual wheel speed gain that is based on the road surface input and the wheel speed at the gain-specific frequency.

Preferably, the vehicle height estimation method further includes: a step of detecting a vehicle speed of the vehicle; a step of performing frequency analysis of the detected wheel speed of a pair of front and rear wheels and calculating a front and rear wheel phase difference at a phase-specific frequency; and a step of, on the basis of the detected vehicle speed, calculating an input phase difference, which is a phase difference between inputs of the front wheel and the rear wheel, and the step of estimating the vehicle height includes calculating, as the vehicle height, a wheel height of the rear wheel on the basis of the calculated front and rear wheel phase difference, the input phase difference, and a relationship, which is the corresponding difference, between the wheel height and an actual wheel speed phase that is based on the road surface input and the wheel speed at the phase-specific frequency.

In the vehicle height estimation method, preferably, the corresponding relationship differs depending on a suspension state of each wheel with respect to the vehicle body, with this state being modified by a suspension state modification device; and in the step of estimating the vehicle height, the vehicle height is estimated on the basis of the corresponding relationship according to the suspension state.

The vehicle height estimation device and the vehicle height estimation method allow estimating the height of a vehicle height on the basis of the wheel speed of a pair of wheels. Therefore, the invention elicits the effect of making it possible to estimate the height of a vehicle inexpensively, without the need for vehicle speed sensors for detecting vehicle height.

MODES FOR CARRYING OUT THE INVENTION

The invention will be explained next in detail with reference to accompanying drawings. The invention is not limited by the embodiments below. The constituent elements in the embodiments below encompass elements that could be easily conceived of by a person skilled in the art, as well as substantially identical elements.

Embodiment 1

Figure 1:
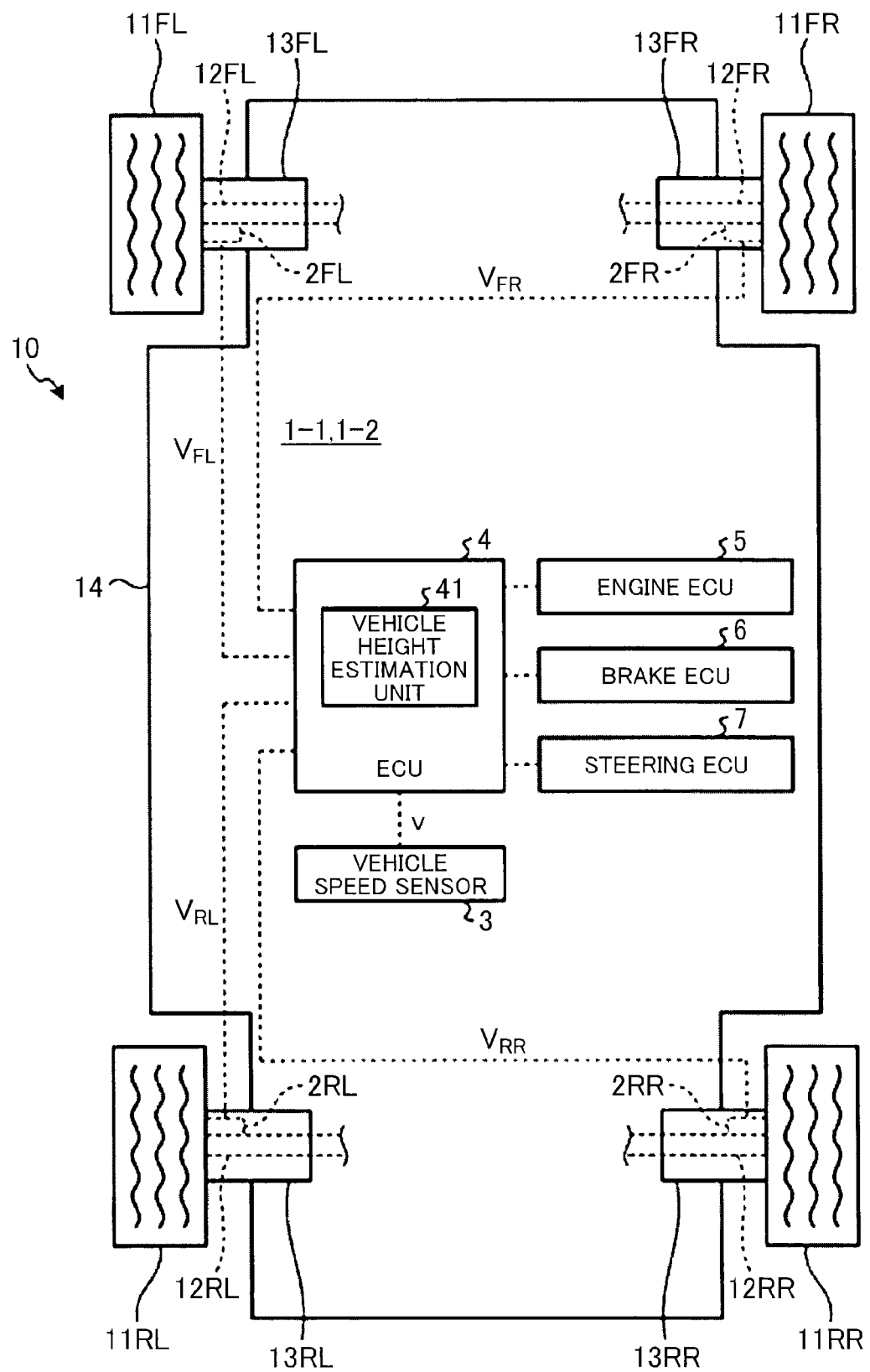
FIG. 1 is a diagram illustrating a configuration example of a vehicle height estimation device according to Embodiments 1 and 2.

FIG. 1 is a diagram illustrating a configuration example of a vehicle height estimation device according to Embodiments 1 and 2. As illustrated in FIG. 1, a vehicle height estimation device 1-1 according to the embodiment is installed in a vehicle 10, and is configured by including at least wheel speed sensors 2FL, 2FR, 2RL, 2RR provided respectively corresponding to a front left wheel 11FL, a front right wheel 11FR, a rear left wheel 11RL and a rear right wheel 11RR, which are respective wheels, as well as a vehicle speed sensor 3, and an electric control unit (ECU) 4. Drive shafts 12FL, 12FR, 12RL, 12RR are respectively connected to the front left wheel 11FL, the front right wheel 11FR, the rear left wheel 11RL and the rear right wheel 11RR, such that the drive shafts 12FL, 12FR, 12RL, 12RR are rotatably supported, with respect to a body 14, by respective suspension devices 13FL, 13FR, 13RL, 13RR. Herein, the configurations of the suspension devices 13FL, 13FR corresponding to the front left and right wheels 11FL, 11FR are identical, and the configurations of the suspension devices 13RL, 13RR corresponding to the rear left and right wheels 11RL, 11RR are likewise identical.

The wheel speed sensors 2FL, 2FR, 2RL, 2RR detect a front left wheel speed $V_{FL}$, a front right wheel speed $V_{FR}$, a rear left wheel speed $V_{RL}$ and a rear right wheel speed $V_{RR}$ (m/s), which are the respective rotational speeds of the wheels 11FL to 11RR. The wheel speeds $V_{FL}$ to $V_{RR}$ detected by the wheel speed sensors 2FL to 2RR are inputted, for instance by way of a CAN communication system, to the ECU 4, which acquires thereupon the wheel speeds $V_{FL}$ to $V_{RR}$.

The vehicle speed sensor 3 detects a vehicle speed v (m/s) that is the speed of the vehicle 10. The detected vehicle speed v is inputted to the ECU 4, as in the case of the wheel speed sensors 2FL to 2RR, whereupon the ECU 4 acquires the vehicle speed v. The vehicle speed sensor 3 is provided on a rotating body such as an output shaft or differential gear, not shown, in a power transmission pathway that transmits to driving wheels (for example, rear wheels 11RL, 11RR) the power generated by a power source (for instance, engine, motor or the like), so that the vehicle speed sensor 3 detects the vehicle speed v on the basis of the rotational speed of the rotating body. The vehicle speed sensor 3 may be the wheel speed sensors 2FL to 2RR, in which case the vehicle speed v is detected on the basis of the wheel speeds $V_{FL}$ to $V_{RR}$ detected by the wheel speed sensors 2FL to 2RR. Alternatively, the vehicle speed sensor 3 may be a sensor that detects position data of the vehicle 10, as typified by a GPS, in which case the vehicle speed v is detected on the basis of changes in the detected position data of the vehicle 10.

The ECU 4 controls, for instance, the braking and driving forces and the behavior of the vehicle 10. The ECU 4 has a vehicle height estimation unit 41 that functions as a vehicle height estimation means. In the embodiment, the vehicle height estimation unit 41 estimates, as the vehicle height, a relative wheel height of one wheel with respect to the other wheel in a pair of left and right wheels, for instance a front left-right wheel vehicle height difference ΔAHFLR, which is the relative wheel height of the front right wheel 11 FR with respect to the front left wheel 11 FL, or a rear left-right wheel vehicle height difference ΔAHRLR which is the relative wheel height of the rear right wheel 11RR with respect to rear left wheel 11 RL, on the basis of the front left wheel speed VFL and front right wheel speed VFR of the front left and right wheels 11FL, 11FR (hereafter referred to simply as "11FLR"), being a pair of left and right wheels, or the rear left wheel speed VRL, and the rear right wheel speed VRR of a rear left and right wheels 11RL, 11RR (hereafter referred to simply as "11RLR"), being a pair of left and right wheels, and on the basis of a corresponding relationship between a wheel height h (mm) of the wheels 11 with respect to the body 14 and a below-described value that is based on wheel speed and on a road surface input (m), in the vertical direction, that is inputted from a road surface to the wheels. Herein, the wheel height h (mm) of a wheel 11 with respect to the body 14 denotes the length, in a vertical direction, from the axles of the wheels 11FL to 11RR, to the connecting sections of the suspension devices 13FL to 13RR to the body 14. In the front wheels 11FL, 11FR, for instance, the wheel height h (mm) is the length, in the vertical direction, from the axles of the front wheels 11FL, 11FR to the connecting sections in which a No. 2 bush of a lower arm of each front wheel suspension device 13FL, 13FR is connected to the body 14. In the rear wheels 1IRL, 11 RR, for instance, the wheel height h (mm) is the length, in the vertical direction, from the axles of the rear wheels 11RL, 11RR to the connecting sections of the lower arms of the front wheel suspension devices 13RL, 13RR to the -body 14. The hardware configuration of the ECU 4 includes, for instance, mainly a central processing unit (CPU) that performs computations, a memory (a random access memory (RAM) such as static random access memory (SRAM) and/or a read only memory (ROM) such as an electrically erasable programmable read-only memory (EEPROM) that stores programs and information, and n input-output interface. The ECU 4 is identical to ECUs installed in conventional vehicles, and hence a detailed explanation thereof will be omitted. The ECU 4 has electrically connected thereto, for instance, an engine ECU 5 that controls a driving source mounted on the vehicle 10 (not shown in figures), for instance an engine, a brake ECU 6 that controls a brake device, and a steering ECU 7 that controls a steering assist amount.

Figure 2:
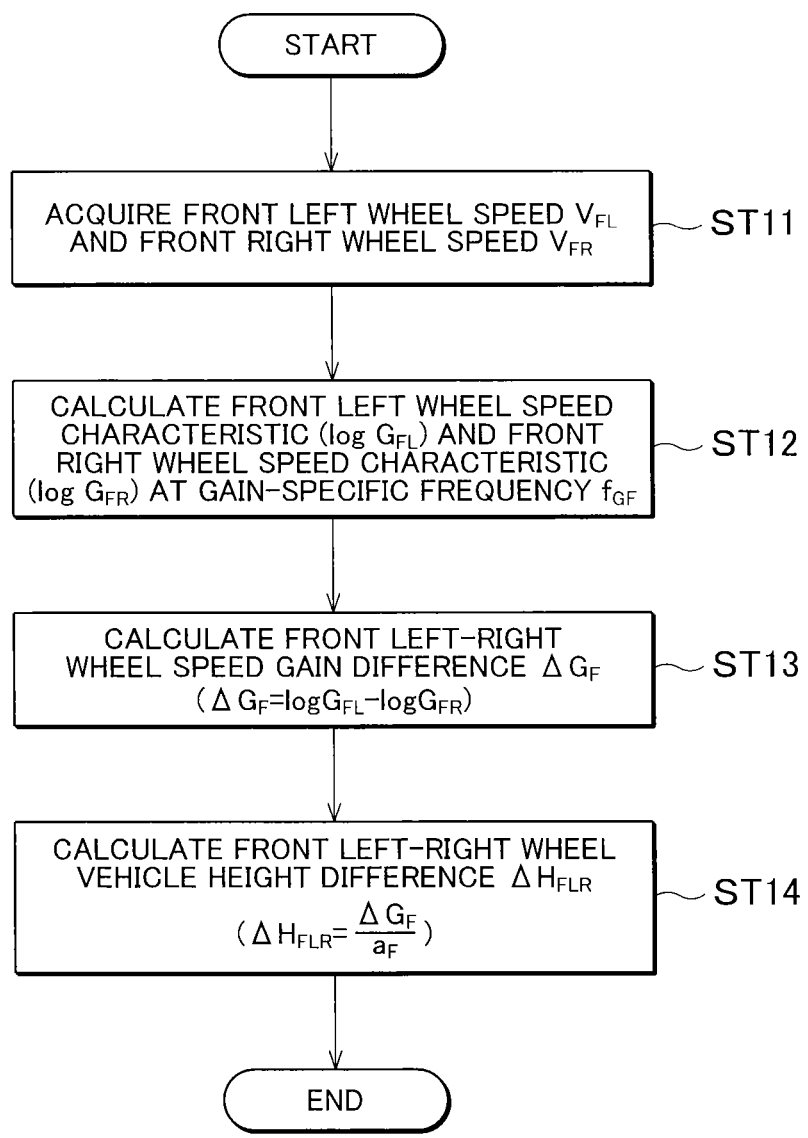
FIG. 2 is a flow diagram illustrating a vehicle height estimation method by the vehicle height estimation device according to Embodiment 1.
Figure 3:
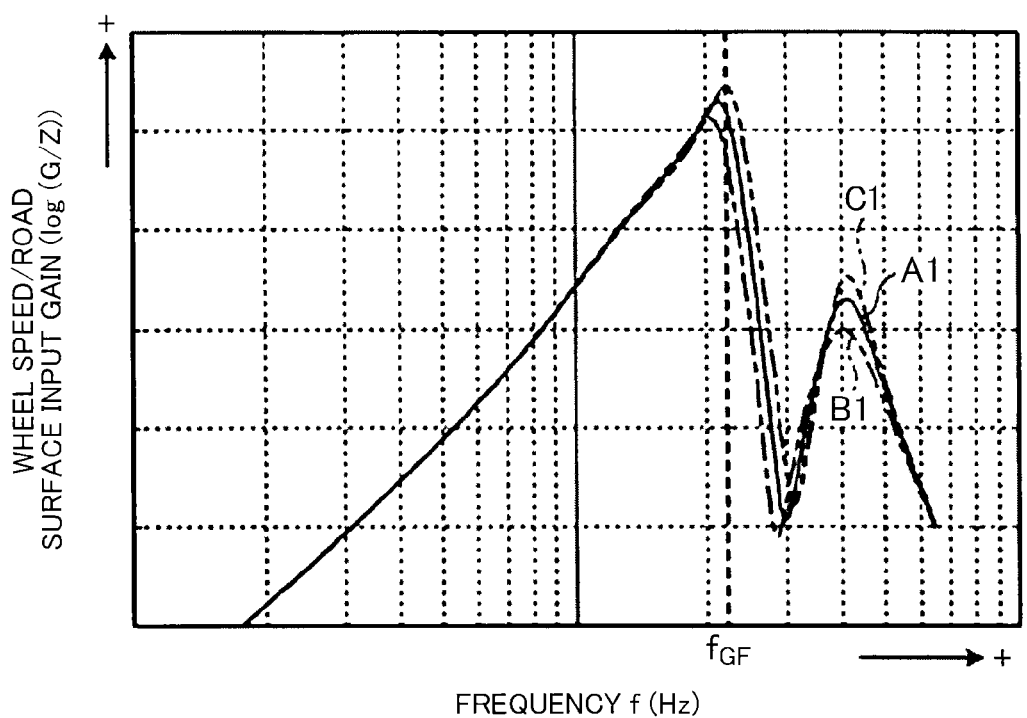
FIG. 3 is a diagram illustrating a relationship between wheel speed/road surface input gain, frequency and wheel height in a front wheel.
Figure 4:
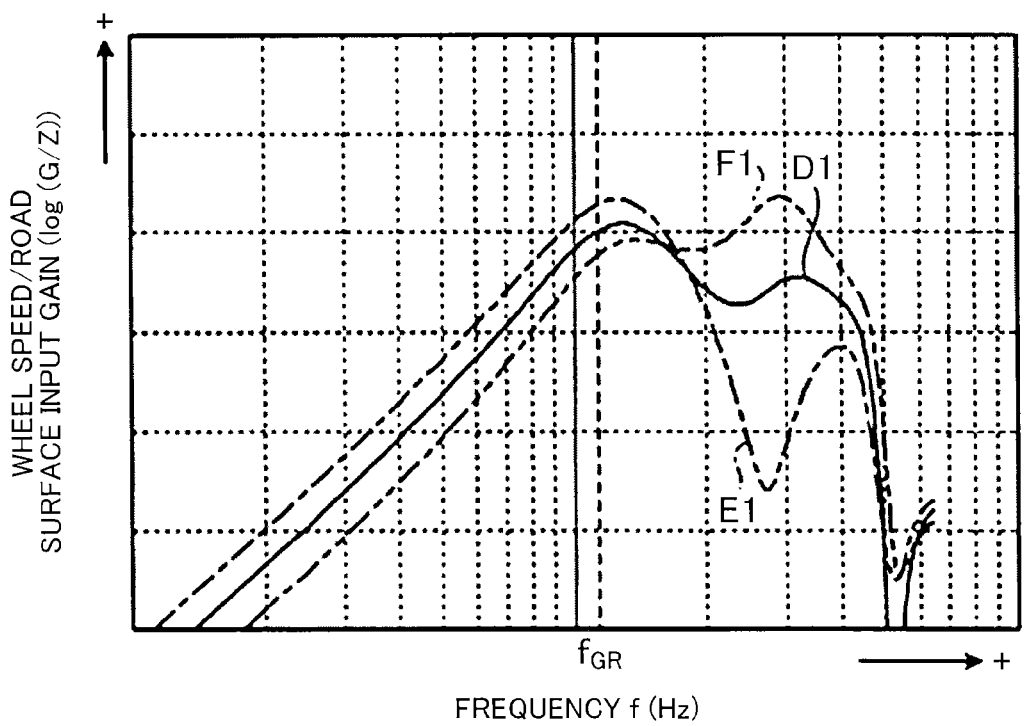
FIG. 4 is a diagram illustrating a relationship between wheel speed/road surface input gain, frequency and wheel height in a rear wheel.
Figure 5:
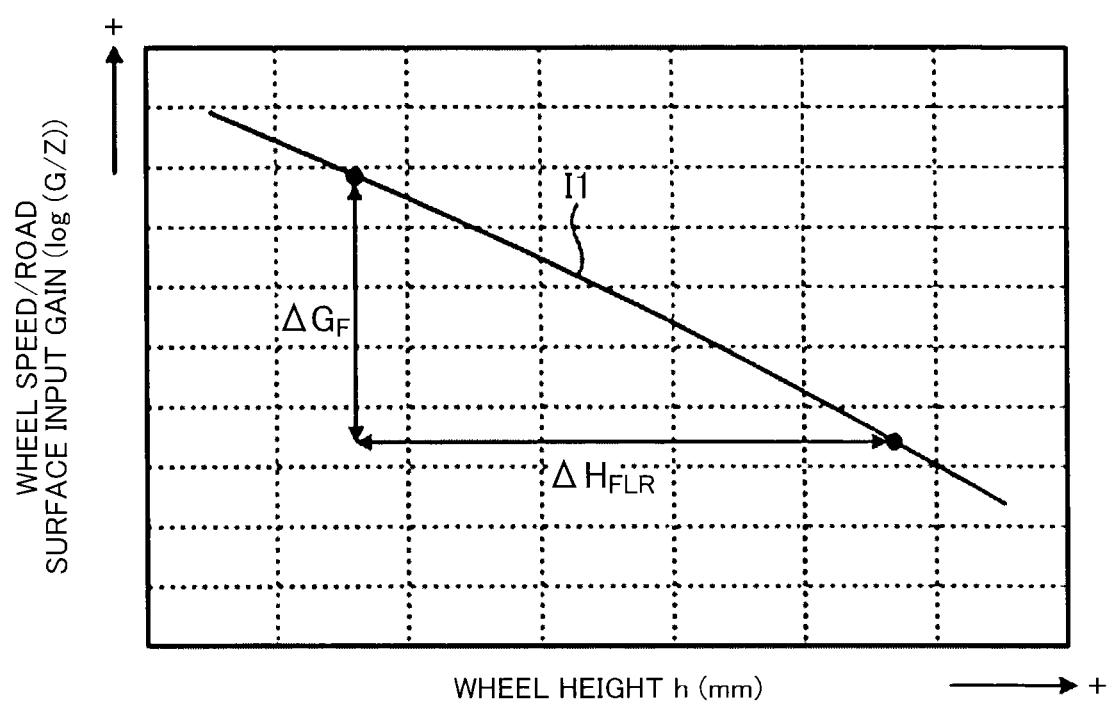
FIG. 5 is a diagram illustrating a relationship between wheel height and wheel speed/road surface input gain at a gain-specific frequency.

A vehicle height estimation method by the vehicle height estimation device 1-1 according to Embodiment 1 will be explained next. The estimation method of the front left-right wheel vehicle height difference $\Delta H_{FLR}$ and the estimation method of the rear left-right wheel vehicle height difference $\Delta H_{RLR}$ are substantially identical, and hence the estimation method of the front left-right wheel vehicle height difference $\Delta H_{FLR}$ will be mainly explained herein. FIG. 2 is a flow diagram illustrating the vehicle height estimation method by the vehicle height estimation device according to Embodiment 1. FIG. 3 is a diagram illustrating a relationship between wheel speed/road surface input gain, frequency and wheel height in a front wheel. FIG. 4 is a diagram illustrating a relationship between wheel speed/road surface input gain, frequency and wheel height in a rear wheel. FIG. 5 is a diagram illustrating a relationship between wheel height and wheel speed/road surface input gain at a gain-specific frequency. FIG. 3, where the ordinate axis represents a wheel speed/road surface input gain (log (G/Z)) (dB), and the abscissa axis represents frequency f (Hz), is a diagram illustrating a front right wheel speed/road surface input gain (log $(G_{FR}/Z_{FR})$), a frequency f and a front right wheel height $h_{FR}$ of the front right wheel 11FR, that is, is a gain characteristic line diagram of wheel speed of the front right wheel 11FR. FIG. 4, in which the ordinate axis represents wheel speed/road surface input gain (log (G/Z)) and the abscissa axis represents frequency f, is a diagram illustrating the relationship between a rear right wheel speed/road surface input gain (log $(G_{RR}/Z_{RR})$), a frequency f and a rear right wheel height $h_{RR}$ of the rear right wheel 11RR, that is, is a gain characteristic line diagram of wheel speed of the rear right wheel 11RR. FIG. 5, in which the ordinate axis represents wheel speed/road surface input gain (log (G/Z)) and the abscissa axis represents wheel height h, is a diagram illustrating a relationship between a front right wheel height $h_{FR}$ and the wheel speed/road surface input gain log $(G_{FR}/Z_{FR})$ of the front right wheel 11FR at a gain characteristic frequency $f_{GF}$ for the front left and right wheels FLR.

Firstly, the vehicle height estimation unit 41 of the ECU 4 acquires the front left wheel speed $V_{FL}$ and the front right wheel speed $V_{FR}$ (step ST11). Herein, the ECU 4 acquires the front left wheel speed $V_{FL}$ and the front right wheel speed $V_{FR}$ of the front left and right wheels 11FLR, from among the detected wheel speeds $V_{FL}$ to $V_{RR}$. To estimate the rear left-right wheel vehicle height difference $\Delta H_{RLR}$, the ECU 4 acquires the rear left wheel speed $V_{RL}$ and the rear right wheel speed $V_{RR}$ of the rear left and right wheels 11RLR.

Next, the vehicle height estimation unit 41 calculates a front left wheel speed gain (log $G_{FL}$) and a front right wheel speed gain (log $G_{FR}$) of the front left and right wheels 11FLR at the gain-specific frequency $f_{GF}$, on the basis of the acquired front left wheel speed $V_{FL}$ and front right wheel speed $V_{FR}$ (step ST12). Herein, the vehicle height estimation unit 41 calculates the front left wheel speed characteristic (log $G_{FL}$) and the front right wheel speed characteristic (log $G_{FR}$) of the front left and right wheels 11FLR at the gain-specific frequency $f_{GF}$ by frequency analysis, for instance on the basis of FFT. The gain-specific frequency $f_{GF}$ is a frequency at which the front left wheel speed/road surface input gain (log $(G_{FL}/Z_{FL})$) and the front right wheel speed/road surface input gain (log $(G_{FR}/Z_{FR})$) respectively change with the front left wheel height $h_{FL}$ and the front right wheel height $h_{FR}$. In the embodiment, the gain-specific frequency $f_{GF}$ denotes the frequency at which there holds a gain characteristic function described below. To estimate the rear left-right wheel vehicle height difference $\Delta H_{RLR}$, the vehicle height estimation unit 41 calculates a rear left wheel speed characteristic (log $G_{RL}$) and a rear right wheel speed characteristic (log $G_{RR}$) of the rear left and right wheels 11RLR at a gain-specific frequency $f_{GR}$. Herein, the gain-specific frequency $f_{GR}$ is a frequency at which a rear left wheel speed/road surface input gain (log $(G_{RL}/Z_{RL})$) and a rear right wheel speed/road surface input gain (log $(G_{RR}/Z_{RR})$) respectively change with the rear left wheel height $h_{RL}$ and the rear right wheel height $h_{RR}$. In the embodiment, the gain-specific frequency $f_{GR}$ is the frequency at which there holds a gain characteristic function described below. That is, each gain-specific frequency $f_G$ is a frequency at which a wheel speed/road surface input gain (log (G/F)) varies in accordance with the wheel height h, and denotes a frequency at which a gain characteristic function holds.

Next, the vehicle height estimation unit 41 calculates a front left-right wheel speed gain difference $\Delta G_F$ on the basis of the calculated front left wheel speed characteristic (log $G_{FL}$) and front right wheel speed characteristic (log $G_{FR}$) (step ST13). Herein, the vehicle height estimation unit 41 calculates, as the front left-right wheel speed gain difference $\Delta G_F$, a value resulting from subtracting the front right wheel speed characteristic (log $G_{FR}$) from the front left wheel speed characteristic (log $G_{FL}$), that is ($\Delta G_F$=log $G_{FL}$−log $G_{FR}$). To estimate the rear left-right wheel vehicle height difference $\Delta H_{RLR}$, the vehicle height estimation unit 41 calculates, as a rear left-right wheel speed gain difference $\Delta G_R$, a value resulting from subtracting the rear right wheel speed characteristic (log $G_{RR}$) from the rear left wheel speed characteristic (log $G_{RL}$), that is ($\Delta G_R$=log $G_{RL}$−log $G_{RR}$).

Next, the vehicle height estimation unit 41 calculates the front left-right wheel vehicle height difference $\Delta H_{FLR}$ on the basis of the calculated front left-right wheel speed gain difference $\Delta G_F$ (step ST14). The vehicle height estimation unit 41 calculates herein the front left-right wheel vehicle height difference $\Delta H_{FLR}$ on the basis of the front left-right wheel speed gain difference $\Delta G_F$ and Expression (1) below. In the expression, $a_F$ is a constant corresponding to the front left and right wheels 11FLR at the gain-specific frequency $f_{GF}$. To estimate the right wheel vehicle height difference $\Delta H_{RLR}$, the vehicle height estimation unit 41 calculates the rear left-right wheel vehicle height difference $\Delta H_{RLR}$ on the basis of the rear left-right wheel speed gain difference $\Delta G_R$ and on the basis of Expression (2) below. In the expression, $a_R$ is a constant corresponding to the rear left and right wheels 11RLR at the gain-specific frequency $f_{GR}$.

$$\Delta H_{FLR} = \Delta G_F / a_F \tag{1}$$

$$\Delta H_{RLR} = \Delta G_R / a_R \tag{2}$$

The reasons why Expressions (1) and (2) allow calculating the front left-right wheel vehicle height difference $\Delta H_{FLR}$ and the rear left-right wheel vehicle height difference $\Delta H_{RLR}$ will be explained next. The road surface, not shown, along which the vehicle 10 travels, has irregularities in the vertical direction. Accordingly, the wheel speeds $V_{FL}$ to $V_{RR}$ are influenced by the road surface input, in the vertical direction, as inputted from the road surface. That is, the wheel speed characteristic (log G) encompasses a road surface input characteristic (log Z) that is based on the road surface input. Upon subtraction of the road surface input characteristic (log Z) from the wheel speed characteristic (log G), there is derived the wheel speed/road surface input gain (log G-log Z=log (G/Z)) being a value based on the wheel speeds $V_{FL}$ to $V_{RR}$ and the road surface input that is inputted from the road surface to the wheels 11FL to 11RR, i.e. there is derived an actual wheel speed gain that is based on wheel speed alone. As illustrated in FIG. 3, differences in the gain characteristic line of the front right wheel 11FR arise or not, depending on the frequency f, between an instance where the front right wheel height $h_{FR}$ is high (B1, denoted by a dashed line) and low (C1, denoted by a two-dot chain line) with respect to a reference value (A1, denoted by a solid line). As illustrated in FIG. 4, differences in the gain characteristic line of the rear right wheel 11RR arise or not, depending on the frequency f, between an instance where the rear right wheel height $h_{RR}$ is high (E1, denoted by a dashed line) and low (F1, denoted by a two-dot chain line) with respect to a reference value (D1, denoted by a solid line). That is, the wheel speed/road surface input gains (log G/Z) of the wheels 11FL to 11RR differ depending on changes in the wheel height h, i.e. depending on changes in geometry, as illustrated in both figures. The changes in geometry affect an unsprung vibration characteristic. Therefore, a transfer relationship of wheel speed and road surface input of the wheels 11FL to 11RR, i.e. the wheel speed characteristic, differs depending on the wheel height h.

In the relationship between the front right wheel speed/road surface input gain (log ($G_{FR}/Z_{FR}$)) of the front left and right wheels 11FLR at the gain-specific frequency $f_{GF}$ i.e. the actual front right wheel speed characteristic and the front right wheel height $h_{FR}$, the front right wheel speed/road surface input gain (log ($G_{FR}/Z_{FR}$)) decreases as the front right wheel height $h_{FR}$ increases, as indicated by I1 in FIG. 5. That is, the relationship between the wheel height h and the wheel speed/road surface input gain (log (G/Z)) at the gain-specific frequency $f_G$ is such that the wheel speed/road surface input gain (log (G/Z)) increases and decreases accompanying increases and decreases of the wheel height h. The gain-specific frequency $f_G$ is set herein to a frequency such that the relationship between the wheel speed/road surface input gain (log (G/Z)) and the wheel height h, i.e. the relationship between the actual wheel speed gain and the wheel height h, can be represented by the gain characteristic function (a×h+b) denoted by I1 in FIG. 5 (a and b are constants of the gain-specific frequency $f_G$). In the embodiment, the corresponding relationship between the wheel height h and the value based on the wheel speeds $V_{FL}$ to $V_{RR}$ and the road surface input is a relationship between the wheel height h and the actual wheel speed gain at the gain-specific frequency $f_G$. Such being the case, the relationship between the wheel height h and the wheel speed/road surface input gain (log (G/Z)) at the gain-specific frequency $f_G$ is given by Expression (3) below.

$$\log(G/Z) = a \times h + b \tag{3}$$

Herein, the road surface input that is inputted to the front left wheel 11FL and the road surface input that is inputted to the front right wheel 11FR can be assumed to be identical with each other in the long term, and hence the same road surface input is inputted to the front left and right wheels 11FLR. That is, the front left wheel speed characteristic (log $G_{FL}$) and the front right wheel speed characteristic (log $G_{FR}$) encompass the road surface input characteristic (log $Z_F$) corresponding to the front left and right wheels 11FLR. The road surface input that is inputted to the rear left wheel 11RL and the road surface input that is inputted to the rear right wheel 11RR can be assumed to be identical with each other in the long term, and hence the same road surface input is inputted to the rear left and right wheels 11RLR. That is, the rear left wheel speed characteristic (log $G_{RL}$) and the rear right wheel speed characteristic (log $G_{RR}$) encompass the road surface input gain (log $Z_R$) corresponding to the rear left and right wheels 11RLR. With reference to Expression (3), the relationship between the wheel height h and the wheel speed/road surface input gain (log (G/Z)) of each of the wheels 11FL to 11RR at the gain-specific frequency $f_G$ can be given by Expressions (4) to (7) below. In the expression, $b_F$ is a constant corresponding to the front left and right wheels 11FLR at the gain-specific frequency $f_{GF}$, and $b_R$ is a constant corresponding to the rear left and right wheels 11RLR at the gain-specific frequency $f_{GR}$.

$$\log(G_{FL}/Z_F) = a_F \times h_{FL} + b_F \tag{4}$$

$$\log(G_{FR}/Z_F) = a_F \times h_{FR} + b_F \tag{5}$$

$$\log(G_{RL}/Z_R) = a_R \times h_{RL} + b_R \tag{6}$$

$$\log(G_{RR}/Z_R) = a_R \times h_{RR} + b_R \tag{7}$$

Upon working out the front left-right wheel speed gain difference $\Delta G_F$ on the basis of Expressions (4) and (5) above in the front left and right wheels 11FLR, the influence of the road surface input that is inputted to the front left and right wheels 11FLR can be eliminated as in Expression (8) below. Similarly, upon working out the rear left-right wheel speed gain difference $\Delta G_R$ on the basis of the Expression (6) and (7) in the rear left and right wheels 11RLR, the influence of the road surface input that is inputted to the rear left and right wheels 11RLR can be eliminated as in Expression (9) below. The difference between the front left wheel height $h_{FL}$ and the front right wheel height $h_{FR}$ is the front left-right wheel vehicle height difference $\Delta H_{FLR}$, as in Expression (10) below. Therefore, the difference between the two values of front left wheel speed/road surface input gain (log ($G_{FL}/Z_{FL}$)) and front right wheel speed/road surface input gain (log ($G_{FR}/Z_{FR}$)), in the ordinate axis, along the gain characteristic line denoted by l1 in FIG. 5, yields the front left-right wheel speed gain difference $\Delta G_F$, while the difference in the abscissa axis yields the front left-right wheel vehicle height difference $\Delta H_{FLR}$. The difference between the rear left wheel height $h_{RL}$ and the rear right wheel height $h_{RR}$ is the rear left-right wheel vehicle height difference $\Delta H_{RLR}$, as illustrated in Expression (11). Therefore, the left-right wheel speed gain difference $\Delta G$ is based on the height of one wheel with respect to that of another wheel in a pair of left and right wheels, i.e. is based on the left-right wheel vehicle height difference $\Delta H$.

$$\Delta G_F = \log G_{FR} - \log G_{FL} = a_F(h_{FL} - h_{FR}) \quad (8)$$

$$\Delta G_R = \log G_{RR} - \log G_{RL} = a_R(h_{RL} - h_{RR}) \quad (9)$$

$$\Delta H_{FLR} = h_{FL} - h_{FR} \quad (10)$$

$$\Delta H_{RLR} h_{RL} - h_{RR} \quad (11)$$

In the vehicle height estimation device 1-1 according to the embodiment, the front left-right wheel vehicle height difference $\Delta H_{FLR}$ can be estimated, as the vehicle height, on the basis of a relationship between the wheel height h and the wheel speed/road surface input gains (log (G/Z)) of the front left and right wheels 11FLR at the gain-specific frequency $f_{GF}$ i.e. the actual wheel speed gain, using, as input parameters, the front left wheel speed $V_{FL}$ and the front right wheel speed $V_{FR}$ of the pair of front left and right wheels 11FLR. The rear left-right wheel vehicle height difference $\Delta H_{RLR}$ can be estimated, as the vehicle height, on the basis of the relationship between the wheel height h and the wheel speed/road surface input gains (log (G/Z)) of the rear left and right wheels 11RLR at the gain-specific frequency $f_{GR}$, i.e. the actual wheel speed gain, using, as input parameters, the rear left wheel speed $V_{RL}$ and the rear right wheel speed $V_{RR}$ of the pair of rear left and right wheels 11RLR. Accordingly, there is no need for a vehicle height sensor that detect vehicle height in the wheels 11FL to 11RR, and thus no new sensor need be added in order to estimate vehicle height in the case of the vehicle 10 that is already equipped with the wheel speed sensors 2FL to 2RR in order to perform braking control, typified by ABS, and behavior control of the vehicle 10. It becomes therefore possible to estimate the vehicle height difference of the left and right wheels in the vehicle 10 inexpensively. If the vehicle height difference between the left and right wheels can be estimated and the suspension devices of the left and right wheels have the same configuration, then a front left-right wheel weight difference $\Delta W_{FLR}$ and a rear left-right wheel weight difference $\Delta W_{RLR}$ can be calculated and estimated, as parameters derived from the vehicle height, by multiplying a wheel rate $K_F$ for the suspension devices 13FL, 13FR of the front left and right wheels 11FLR, and a wheel rate $K_R$ for the suspension devices 13RL, 13RR of the rear left and right wheels 11RLR, by the front left-right wheel vehicle height difference $\Delta H_{FLR}$ and the rear left-right wheel vehicle height difference $\Delta H_{RLR}$, respectively. That is, a left-right difference in vehicle weight can be estimated, the rear left-right wheel vehicle height difference can be used as an input parameter of braking control, such as ABS, or behavior control of the vehicle 10, and high-precision control in accordance with the travel state of the vehicle 10 is enabled, by estimating the front left-right wheel vehicle height difference $\Delta H_{FLR}$ and the rear left-right wheel vehicle height difference $\Delta H_{RLR}$.

In the embodiment, the vehicle height estimation unit 41 estimates the front left-right wheel vehicle height difference $\Delta H_{FLR}$ and the rear left-right wheel vehicle height difference $\Delta H_{RLR}$, but the invention is not limited thereto, and the vehicle height estimation unit 41 may estimate either one of the foregoing. For instance, the vehicle height difference between the left and right wheels for the front left and right wheels 11FLR is greater, for instance during turning of the vehicle 10, than that for the rear left and right wheels 11RLR, and hence the vehicle height estimation unit 41 may estimate the front left-right wheel vehicle height difference $\Delta H_{FLR}$ alone.

Embodiment 2

A vehicle height estimation device according to Embodiment 2 will be explained next. The basic configuration of a vehicle height estimation device 1-2 according to Embodiment 2 is identical to that of the vehicle height estimation device 1-1 according to Embodiment 1, and hence the configuration of the former will not be explained again. The vehicle height estimation unit 41 in the ECU 4 of the vehicle height estimation device 1-2 according to Embodiment 2 estimates, as the vehicle height, the rear right wheel height $h_{RR}$ of a rear wheel in a pair of front and rear wheels, on the basis of the front right wheel speed $V_{FR}$ and the rear right wheel speed $V_{RR}$ of the right front and rear wheels 11FR, 11RR (hereafter simply referred to as "right front and rear wheels 11RFR") being a pair of front and rear wheels, and on the basis of a corresponding relationship between the wheel height h (mm) and a below-described value that is based on wheel speed and on the road surface input, in the vertical direction, that is inputted from the road surface to the wheels.

Figure 6:
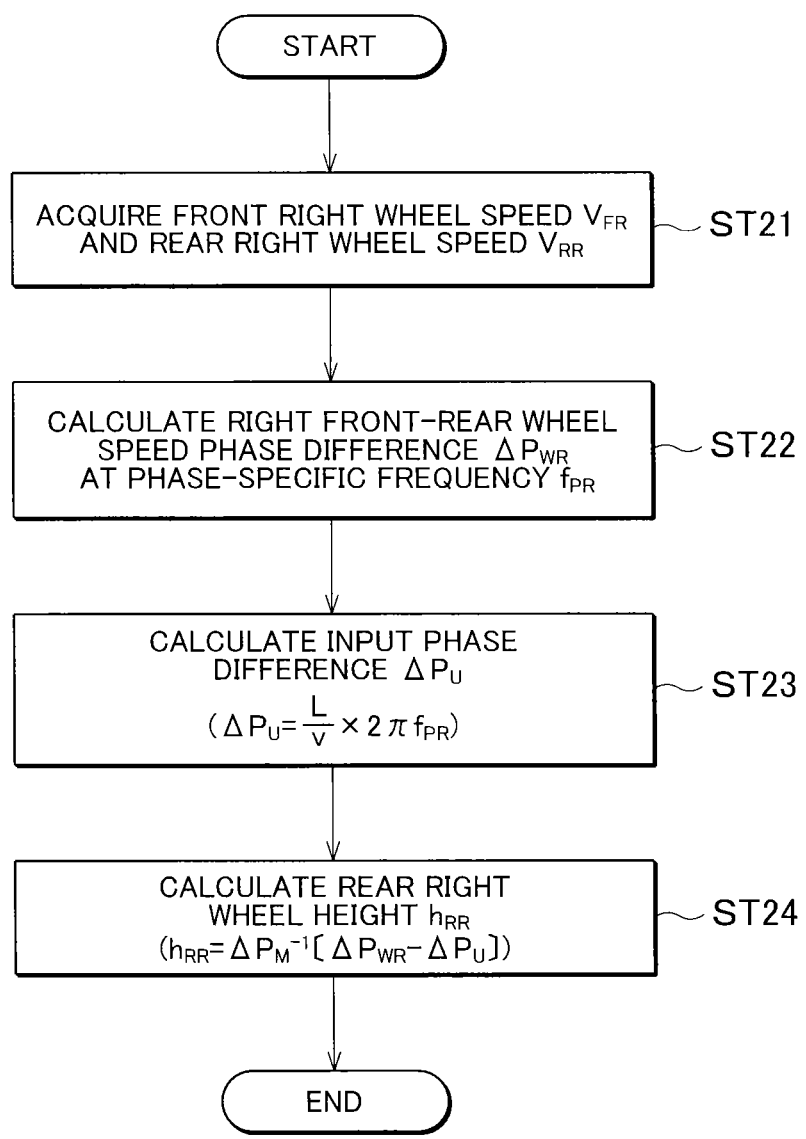
FIG. 6 is a flow diagram illustrating a vehicle height estimation method by a vehicle height estimation device according to Embodiment 2.
Figure 7:
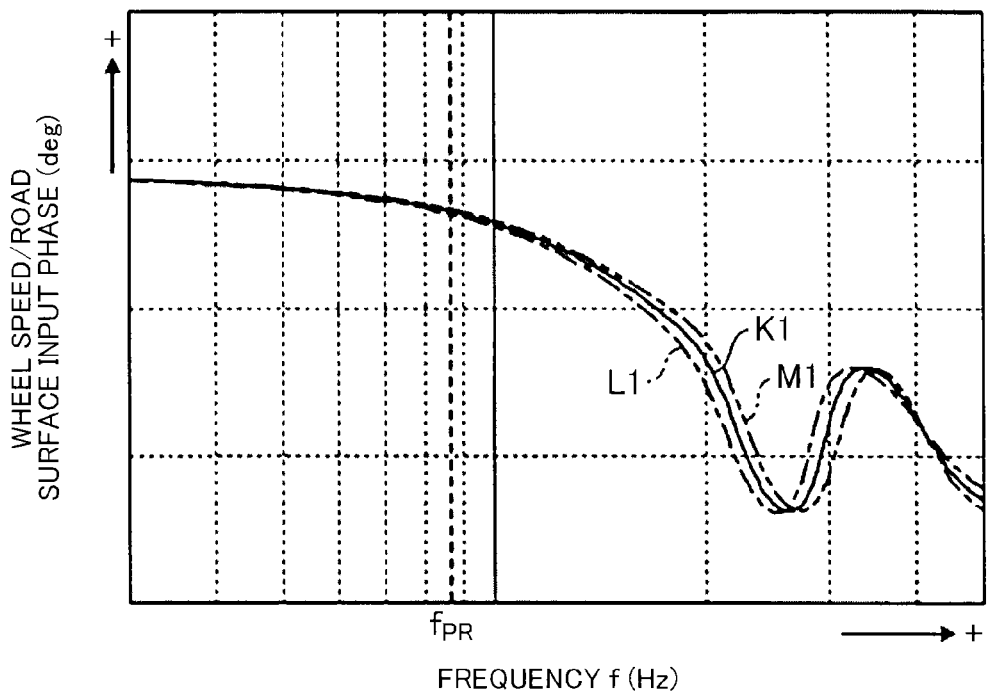
FIG. 7 is a diagram illustrating a relationship between wheel speed/road surface input phase, frequency and wheel height in a front wheel.
Figure 8:
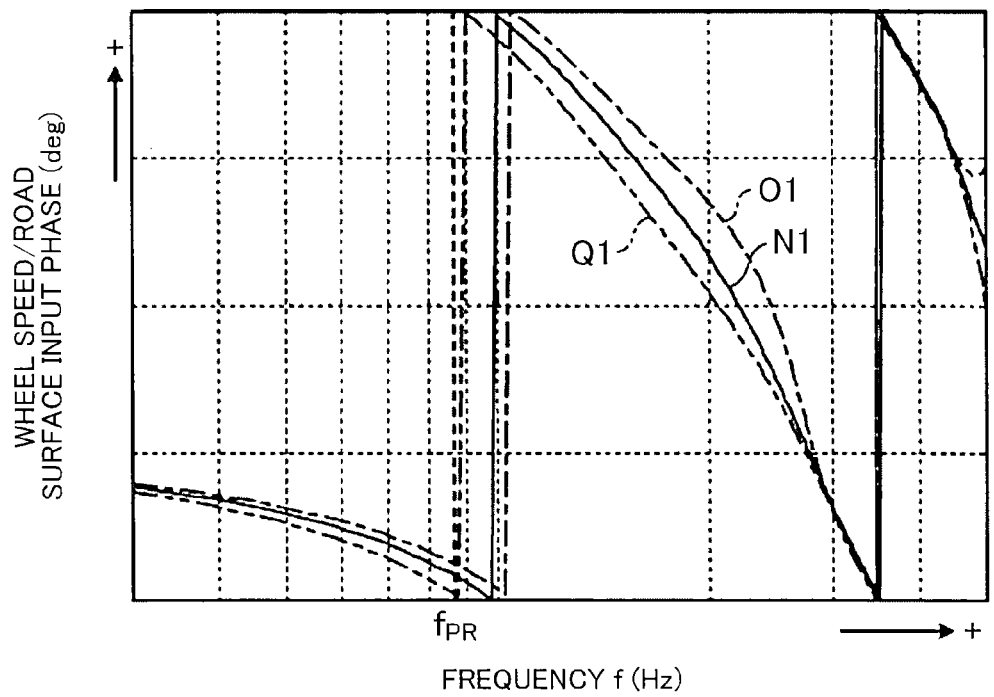
FIG. 8 is a diagram illustrating a relationship between wheel speed/road surface input phase, frequency and wheel height in a rear wheel.
Figure 9:
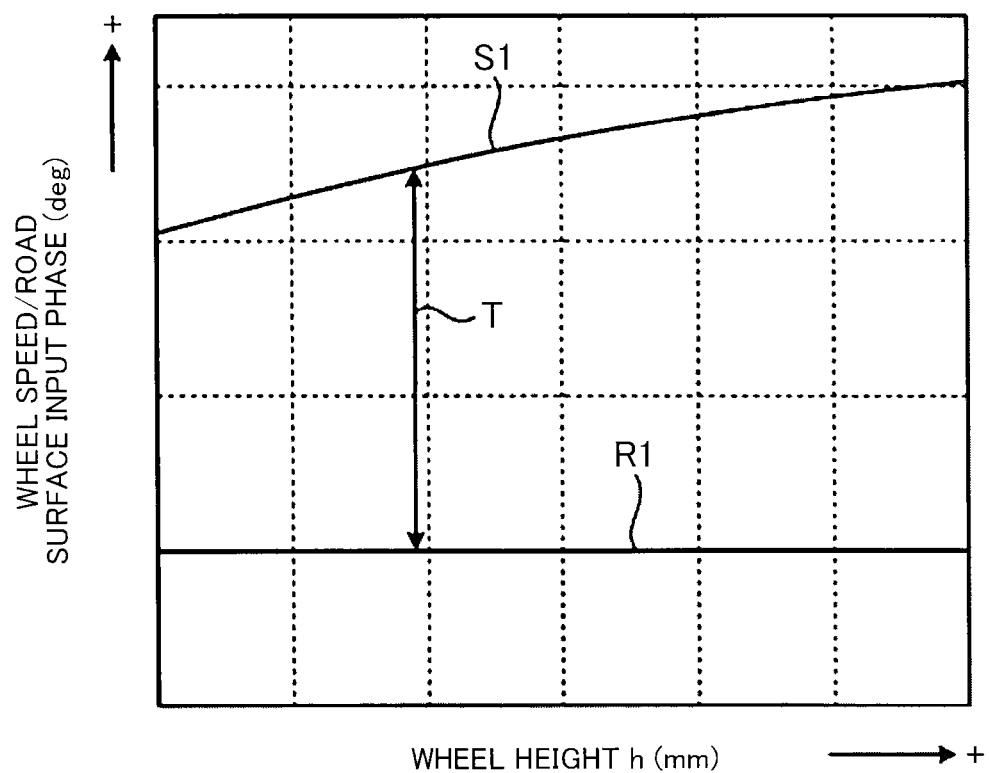
FIG. 9 is a diagram illustrating a relationship between wheel height and wheel speed/road surface input phase at a phase-specific frequency.

A vehicle height estimation method by the vehicle height estimation device 1-2 according to Embodiment 2 will be explained next. FIG. 6 is a flow diagram illustrating the vehicle height estimation method by the vehicle height estimation device according to Embodiment 2. FIG. 7 is a diagram illustrating a relationship between wheel speed/road surface input phase, frequency and wheel height in a front wheel. FIG. 8 is a diagram illustrating a relationship between wheel speed/road surface input phase, frequency and wheel height in a rear wheel. FIG. 9 is a diagram illustrating a relationship between wheel height and wheel speed/road surface input phase at a phase-specific frequency. FIG. 7, in which the ordinate axis represents wheel speed/road surface input phase (deg) and the abscissa axis represents frequency f (Hz), is a diagram illustrating a relationship between the front right wheel speed/road surface input phase, the frequency f and the front right wheel height $h_{FR}$ of the front right wheel 11FR, i.e. is a phase characteristic line diagram of wheel speed of the front right wheel 11FR. FIG. 8, in which the ordinate axis represents wheel speed/road surface input phase and the abscissa axis represents frequency f, is a diagram illustrating the relationship between the rear right wheel speed/road surface input phase, the frequency f and the rear right wheel height $h_{RR}$ of the rear right wheel 11RR, i.e., is a phase characteristic line diagram of wheel speed of the rear right wheel 11RR. FIG. 9, in which the ordinate axis represents wheel speed/road surface input phase and the abscissa axis represents wheel height h, is a diagram illustrating the relationship between the front right wheel height $h_{FR}$ and the wheel speed/road surface input phase of the front right wheel 11FR and the relationship between the rear right wheel height $h_{RR}$ and the wheel speed/road surface input phase of the rear right wheel 11RR, at the phase characteristic frequency $f_{PR}$.

Firstly, the vehicle height estimation unit 41 of the ECU 4 acquires the front right wheel speed $V_{FR}$ and the rear right wheel speed $V_{RR}$ (step ST21). Herein, the vehicle height estimation unit 41 acquires the front right wheel speed $V_{FR}$ and the rear right wheel speed $V_{RR}$ of the right front and rear wheels 11RFR, from among the detected wheel speeds $V_{FL}$ to $V_{RR}$.

Next, the vehicle height estimation unit 41 calculates a right front-rear wheel speed phase difference $\Delta P_{WR}$ of the right front and rear wheels 11RFR at the phase-specific frequency $f_{PR}$, on the basis of the acquired front right wheel speed $V_{FR}$ and rear right wheel speed $V_{RR}$ (step ST22). Herein, the vehicle height estimation unit 41 calculates the front right wheel speed phase and the rear right wheel speed phase of the right front and rear wheels 11RFR at the phase-specific frequency $f_{PR}$ by frequency analysis, for instance on the basis of FFT, and calculates the right front-rear wheel speed phase difference $\Delta P_{WR}$ on the basis of Expression (12) below. Herein, FFT (front right wheel speed) is the front right wheel speed phase, and FFT (rear right wheel speed) is the rear right wheel speed phase. The phase-specific frequency $f_{PR}$ is a frequency at which the front left wheel speed/road surface input phase does not change with the front right wheel height $h_{FL}$ and the rear right wheel speed/road surface input phase changes with the rear right wheel height $h_{RR}$. That is, the phase-specific frequency $f_P$ is a frequency at which the front wheel speed/road surface input phase does not change with the front wheel height $h_F$ and the rear wheel speed/road surface input phase changes in accordance with the rear wheel height $h_R$. Herein, the road surface input that is inputted to the front right wheel 11FR and the road surface input that is inputted to the rear right wheel 11RR can be assumed to be identical with each other in the long term, and hence the same road surface input is inputted to the right front and rear wheels 11RFR. That is, the front right wheel speed phase and the rear right wheel speed phase include the road surface input phase corresponding to the right front and rear wheels 11RFR. Therefore, the front right wheel road surface input phase and the rear right wheel road surface input phase are cancelled through calculation of the right front-rear wheel speed phase difference $\Delta P_{WR}$.

$$\Delta P_{WR} = \text{Phase}(\text{FFT(rear right wheel speed)}/\text{FFT(front right wheel speed)}) \quad (12)$$

Next, the vehicle height estimation unit 41 calculates an input phase difference $\Delta P_U$ (step ST23). The vehicle height estimation unit 41 calculates the input phase difference $\Delta P_U$ on the basis of a wheelbase L (length of the right front and rear wheels 11RFR) of the vehicle 10, the vehicle speed v, the phase characteristic frequency $f_{PR}$, and Expression (13) below. The rear wheels 11RL, 11RR exhibit a phase lag, with respect to the front wheels 11FL, 11FR, that depends on the wheelbase L (length of the right front and rear wheels 11RFR) and on the vehicle speed v. The input phase difference $\Delta P_U$ is thus calculated herein in order to eliminate, from the right front-rear wheel speed phase difference $\Delta P_{WR}$, the input phase difference $\Delta P_U$, which is a phase lag component.

$$\Delta P_U = L/v \times 2\pi f_{PR} \quad (13)$$

Next, the vehicle height estimation unit 41 calculates the rear right wheel height $h_{RR}$ on the basis of the calculated right front-rear wheel speed phase difference $\Delta P_{WR}$ and the input phase difference $\Delta P_U$ (step ST24). The vehicle height estimation unit 41 calculates the rear right wheel height $h_{RR}$ on the basis of the right front-rear wheel speed phase difference $\Delta P_{WR}$, the input phase difference $\Delta P_U$ and Expression (14) below. Herein, $\Delta P_M(h)$ is a transfer function of the front and rear wheel speed.

$$h_{RR} = \Delta P_M^{-1}(\Delta P_{WR} - \Delta P_U) \quad (14)$$

The reason why the rear right wheel height $h_{RR}$ can be calculated on the basis of Expression (14) will be explained next. The road surface, not shown, along which the vehicle 10 travels, has irregularities in the vertical direction. Accordingly, the wheel speeds $V_{FL}$ to $V_{RR}$ are influenced by the road surface input, in the vertical direction, as inputted from the road surface. That is, the wheel speed phase includes the road surface input phase that is based on the road surface input. Upon subtraction of the road surface input phase from the wheel speed phase, there is derived a wheel speed/road surface input phase being a value that is based on the wheel speeds $V_{FL}$ to $V_{RR}$ and the road surface input that is inputted from the road surface to the wheels 11FL to 11RR, i.e. there is derived an actual wheel speed phase that is based on wheel speed alone. As illustrated in FIG. 7, differences in the phase characteristic line of the front right wheel 11FR arise or not, depending on the frequency f, between an instance where the front right wheel height $h_{FL}$ is high (L1 denoted by the dashed line) with respect to a reference value (K1 denoted by the solid line) and an instance where the front right wheel height $h_{FL}$ is low (M1, denoted by the two-dot chain line) with respect to the reference value. As illustrated in FIG. 8, differences in the phase characteristic line of the rear right wheel 11RR arise or not, depending on the frequency f, between an instance where the rear right wheel height $h_{RR}$ is high (O1, denoted by the dashed line) with respect to a reference value (N1, denoted by the solid line) and an instance where the rear right wheel height $h_{RR}$ is low (Q1, denoted by the two-dot chain line) with respect to the reference value. As is the case with gain, the wheel speed/road surface input phase of each of the wheels 11FL to 11RR differs depending on changes in the wheel height h, i.e. depending on changes in geometry, as illustrated in both figures. Therefore, a transfer relationship between wheel speed and road surface input for the wheels 11FL to 11RR, i.e. a phase characteristic of wheel speed, differs depending on the wheel height h.

As denoted by R1 in FIG. 9, the relationship between the front right wheel height $h_{FR}$ and the front right wheel speed/road surface input phase of the right front and rear wheels 11RFR at the phase-specific frequency $f_{PR}$, i.e. the actual front right wheel speed phase is constant, regardless of changes in the front right wheel height $h_{FR}$. That is, the result of a front wheel phase characteristic function ($P_F=P_F(h)$) being a relationship between the wheel height h and the wheel speed/road surface input phase of the front wheels at the phase-specific frequency $f_{PR}$, is constant ($P_F$=const). On the other hand, the relationship between the rear right wheel height $h_{RR}$ and the rear right wheel speed/road surface input phase of the right front and rear wheels 11RFR at the phase-specific frequency $f_{PR}$, i.e. the actual rear right wheel speed phase, is such that the rear right wheel speed/road surface input phase increases with increasing rear right wheel height $h_{RR}$, as denoted by S1 in the figure. That is, the result of the rear wheel phase characteristic function ($P_R=P_R(h)$), being a relationship between the wheel height h and the wheel speed/road surface input phase at the phase-specific frequency $f_{PR}$, is such that the wheel speed/road surface input phase increases and decreases accompanying increases and decreases of the wheel height h. In the embodiment, the corresponding relationship between the wheel height h and the value that is based on the wheel speeds $V_{FL}$ to $V_{RR}$ and the road surface input is a relationship between the wheel height h and the actual wheel speed phase at the phase-specific frequency $f_P$.

The phase difference of the rear wheels with respect to the front wheels can be worked out on the basis of Expression (15), as a result of the transfer function ($\Delta P_M(h)$) of the front and rear wheel speed that is based on the front wheel phase characteristic function ($P_F=P_F(h)$) and the rear wheel phase characteristic function ($P_R=P_R(h)$), as denoted by T in the figure.

$$\Delta P_M(h)=P_R(h)-P_F \quad (15)$$

Therefore, the value resulting from subtracting the input phase difference $\Delta P_U$ from the right front-rear wheel speed phase difference $\Delta P_{WR}$ and the result of the transfer function ($\Delta P_M(h)$) of the front and rear wheel speed are identical, and hence Expression (14) can be derived from Expression (16) below.

$$\Delta P_M(h)=\Delta P_{WR}-\Delta P_U \quad (16)$$

As explained above, the vehicle height estimation device 1-2 according to the embodiment can estimate the rear right wheel height $h_{RR}$, as the vehicle height, on the basis of a relationship between the wheel height h and the wheel speed/road surface input phase of the right front and rear wheels 11RFR at the phase-specific frequency $f_{PR}$, i.e. the actual wheel speed phase, using, as input parameters, the front right wheel speed $V_{FR}$ and the rear right wheel speed $V_{RR}$ of the pair of right front and rear wheels 11RFR. Accordingly, and the vehicle height of the rear wheels of the vehicle 10 can be estimated inexpensively, as in the case of Embodiment 1, without the need for a vehicle height sensor that detects the vehicle height of the wheels 11FL to 11RR.

Further, the rear left wheel height $h_{RL}$ can be estimated, as the vehicle height, on the basis of a relationship between the wheel height h and the wheel speed/road surface input phase of the pair of front left and rear wheels 11FL, 11RL (hereafter simply referred to as "front left and rear wheels 11LFR") at the phase-specific frequency $f_{PL}$, i.e. the actual wheel speed phase, using, as input parameters, the front left wheel speed $V_{FL}$ and the rear left wheel speed $V_{RL}$ of the front left and rear wheels 11LFR. Therefore, the rear left-right wheel vehicle height difference $\Delta H_{RLR}$ can be estimated on the basis of the rear right wheel height $h_{RR}$ and the rear left wheel height $h_{RL}$ ($\Delta H_{RLR}=h_{RL}-h_{RR}$). If the rear left-right wheel vehicle height difference $\Delta H_{RLR}$ can be estimated, and the suspension devices of the rear left and right wheels have the same configuration, then the rear left-right wheel weight difference $\Delta W_{RLR}$ can be calculated and estimated by multiplying the wheel rate $K_R$ of the suspension devices 13RL, 13RR of the rear left and right wheels 11RLR by the rear left-right wheel vehicle height difference $\Delta H_{RLR}$. High-precision control in accordance with the travel state of the vehicle 10 is enabled thus, as in the case of Embodiment 1.

For instance, the relative wheel height of the front right wheel 11FR with respect to the front left wheel 11FL of the vehicle 10, and the wheel height of the rear left and right wheels RLR can be estimated, as the vehicle height, through a combination with the front left-right wheel vehicle height difference $\Delta H_{FLR}$ that is estimated as the vehicle height in Embodiment 1. This enables therefore control, with yet higher precision, in accordance with the travel state of the vehicle 10.

In the embodiment, the vehicle height estimation unit 41 estimates the vehicle height of the rear wheels on the basis of the front right wheel speed $V_{FR}$ and the rear right wheel speed $V_{RR}$ of the pair of right front and rear wheels 11RFR, but the invention is not limited thereto, and the vehicle height of the rear wheels may be estimated on the basis of an average value of the front right wheel speed $V_{FR}$ and the front left wheel speed $V_{FL}$, and an average value of the rear right wheel speed $V_{RR}$ and the rear left wheel speed $V_{RL}$.

Embodiment 3

Figure 10:
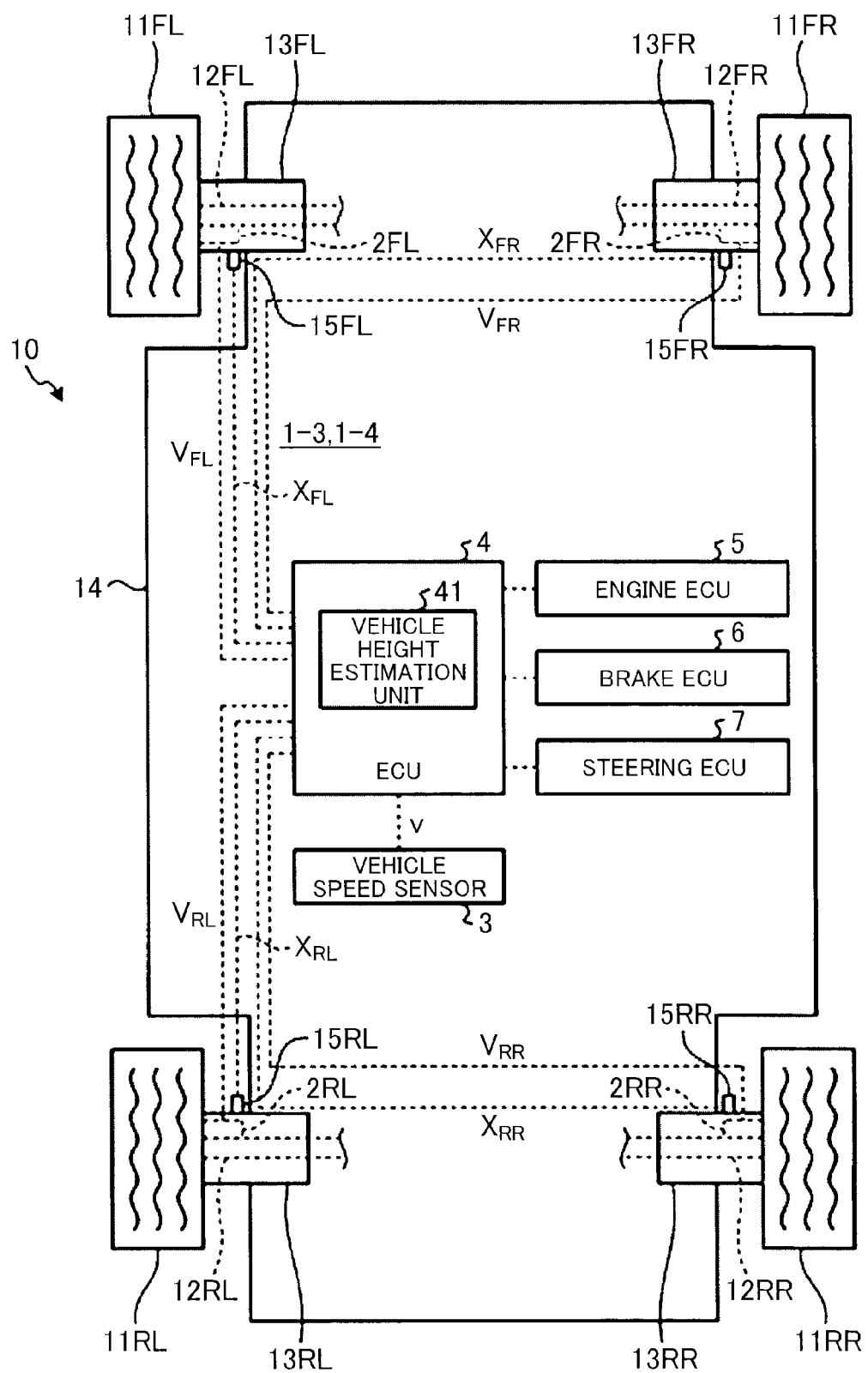
FIG. 10 is a diagram illustrating a configuration example of a vehicle height estimation device according to Embodiments 3 and 4.

A vehicle height estimation device according to Embodiment 3 will be explained next. FIG. 10 is a diagram illustrating a configuration example of a vehicle height estimation device according to Embodiments 3 and 4. Those portions in the basic configuration of a vehicle height estimation device 1-3 according to Embodiment 3 that are identical to those of the vehicle height estimation device 1-1 according to Embodiment 1 will not be explained again herein. As illustrated in FIG. 10, the vehicle height estimation device 1-3 according to Embodiment 3 is provided with suspension state modification devices 15FL to 15RR. The suspension state modification devices 15FL to 15RR are devices that modify the suspension state of the respective wheels 11FL to 11RR with respect to the body 14, and are provided in the respective suspension devices 13FL to 13RR. The suspension state modification devices 15FL to 15RR in the embodiment modify the damping forces of the respective suspension devices 13FL to 13RR. The suspension state modification devices 15FL to 15RR modify damping forces on the basis of suspension control values X that are outputted, as a command value, by the ECU 4. That is, the vehicle 10 equipped with the vehicle height estimation device 1-3 according to the Embodiment 3 has an adaptive variable suspension system (AVS system) installed therein. Herein the damping force is set to be modifiable to large, medium and small.

In the embodiment, the vehicle height estimation unit 41 estimates, as the vehicle height, the front left-right wheel vehicle height difference $\Delta H_{FLR}$ or the rear left-right wheel vehicle height difference $\Delta H_{RLR}$, on the basis of the front left wheel speed $V_{FL}$ and the front right wheel speed $V_{FR}$ of the front left and right wheels 11FLR, or the rear left wheel speed $V_{RL}$ and the rear right wheel speed $V_{RR}$ of the rear left and right wheels 11RLR, and on the basis of a corresponding relationship between the wheel height h and a value that is based on wheel speed and on the road surface input and that differs depending on the suspension state (damping force).

Figure 11:
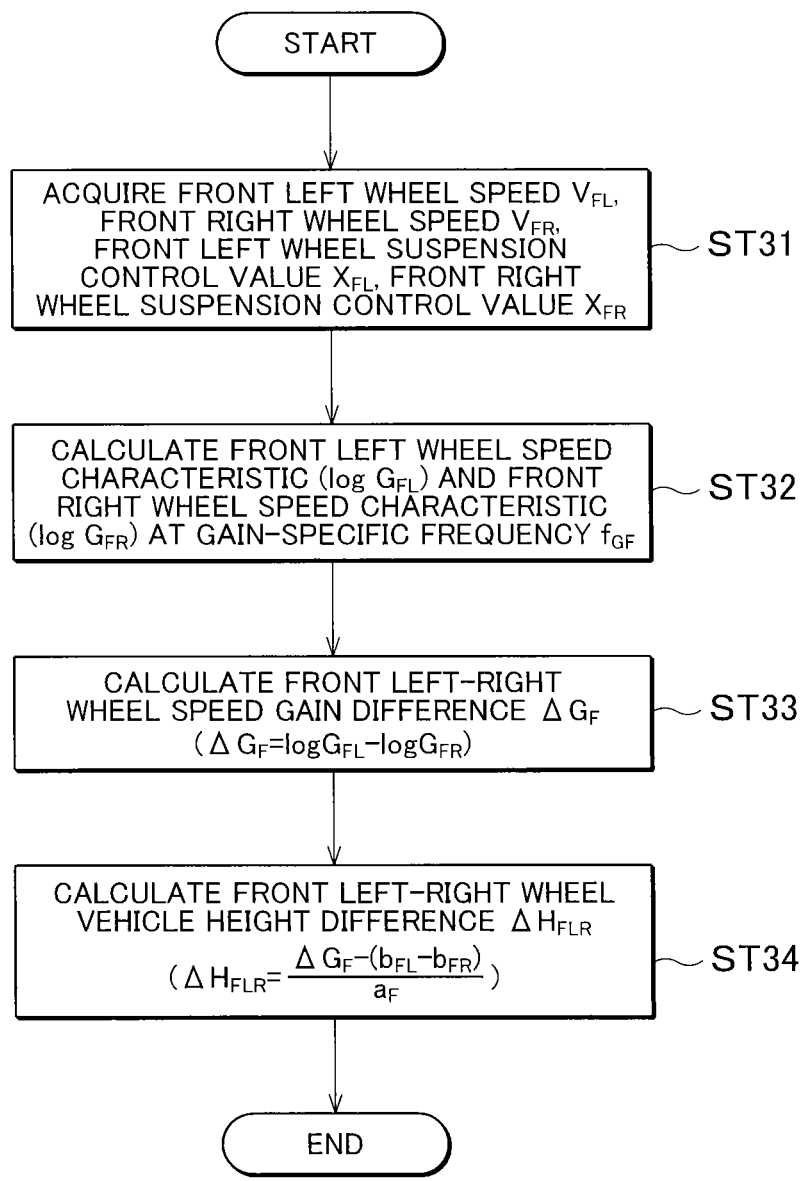
FIG. 11 is a flow diagram illustrating a vehicle height estimation method by the vehicle height estimation device according to Embodiment 3.
Figure 12:
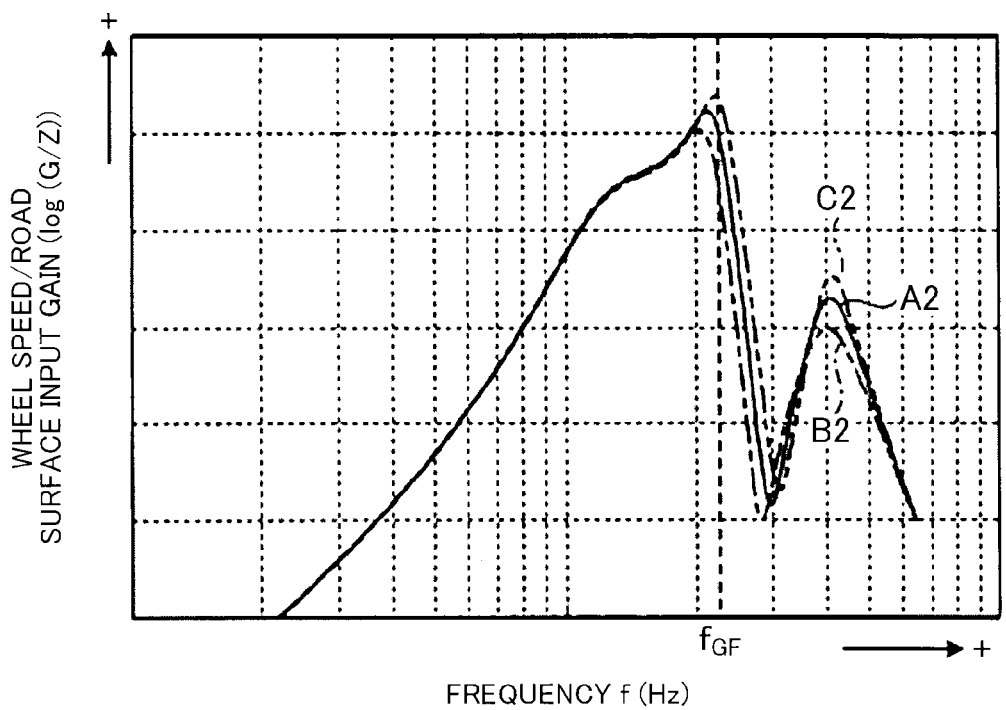
FIG. 12 is a diagram illustrating a relationship (small damping) between wheel speed/road surface input gain, frequency and wheel height in a front wheel.
Figure 13:
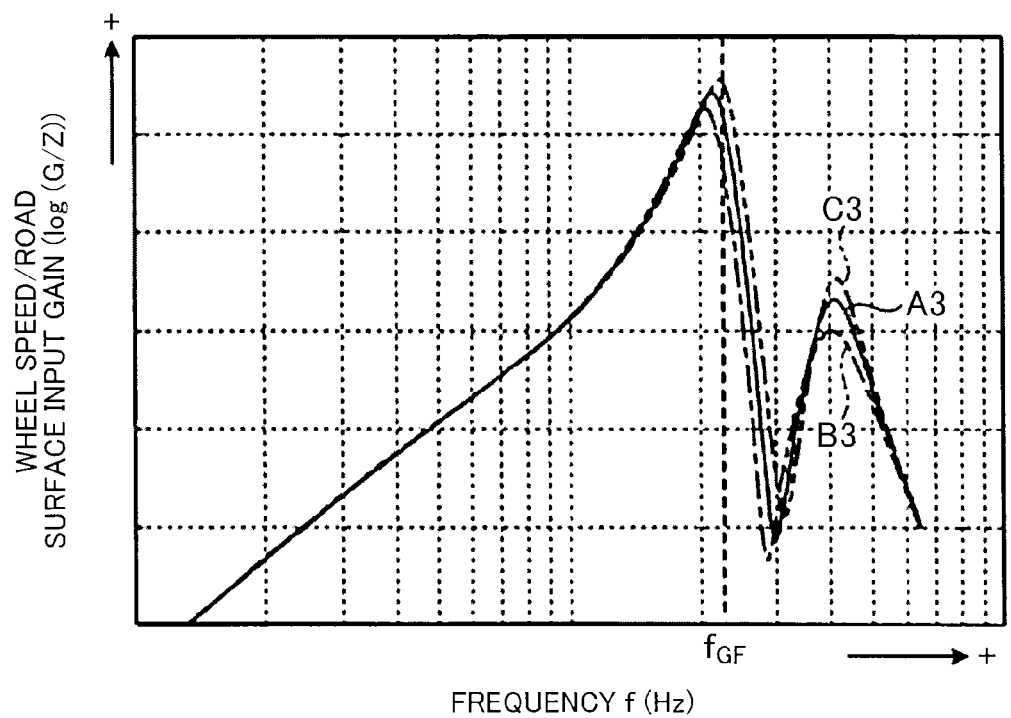
FIG. 13 is a diagram illustrating a relationship (large damping) between wheel speed/road surface input gain, frequency and wheel height in a front wheel.
Figure 14:
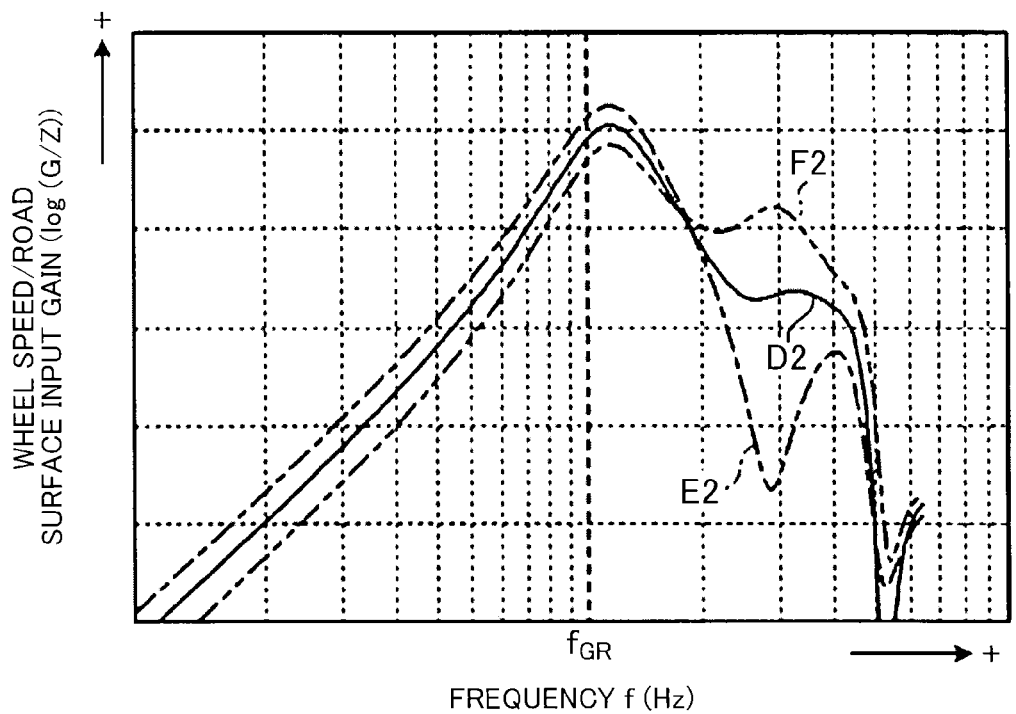
FIG. 14 is a diagram illustrating a relationship (small damping) between wheel speed/road surface input gain, frequency and wheel height in a rear wheel.
Figure 15:
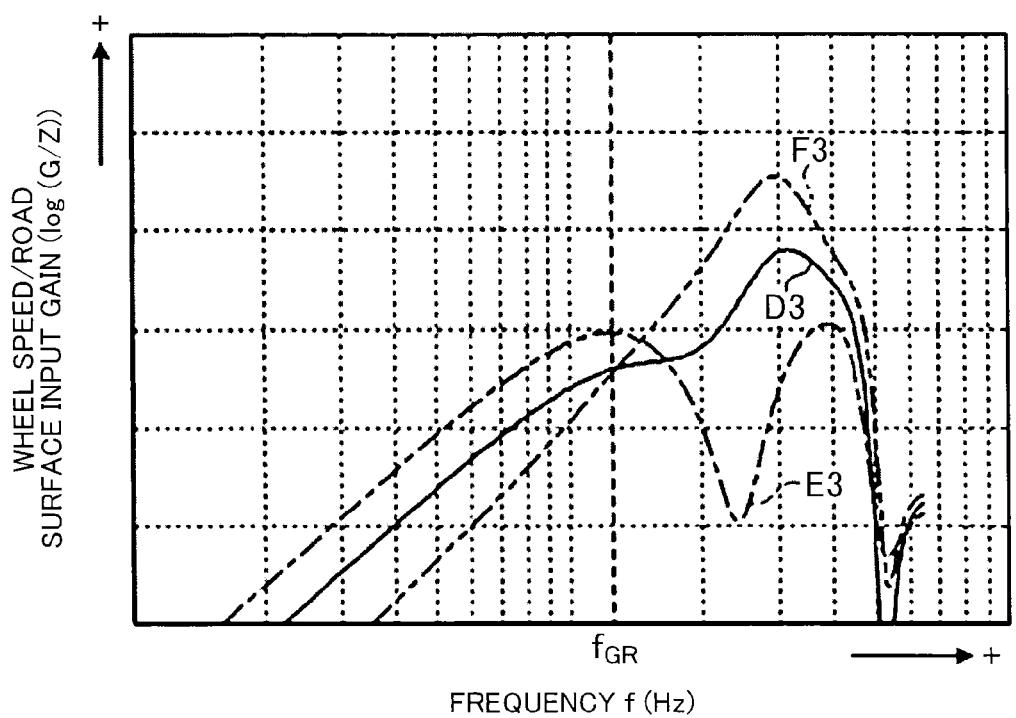
FIG. 15 is a diagram illustrating a relationship (large damping) between wheel speed/road surface input gain, frequency and wheel height in a rear wheel.

A vehicle height estimation method by the vehicle height estimation device 1-3 according to Embodiment 3 will be explained next. The basic steps of the vehicle height estimation method by the vehicle height estimation device 1-3 according to Embodiment 3 are substantially identical to the steps of the vehicle height estimation method by the vehicle height estimation device 1-1 according to Embodiment 1, and hence an explanation thereof will be omitted or simplified. FIG. 11 is a flow diagram illustrating the vehicle height estimation method by the vehicle height estimation device according to Embodiment 3. FIG. 12 is a diagram illustrating a relationship (small damping) between wheel speed/road surface input gain, frequency and wheel height in a front wheel. FIG. 13 is a diagram illustrating a relationship (large damping) between wheel speed/road surface input gain, frequency and wheel height in a front wheel. FIG. 14 is a diagram illustrating a relationship (small damping) between wheel speed/road surface input gain, frequency and wheel height in a rear wheel. FIG. 15 is a diagram illustrating a relationship (large damping) between wheel speed/road surface input gain, frequency and wheel height in a rear wheel.

Figure 16:
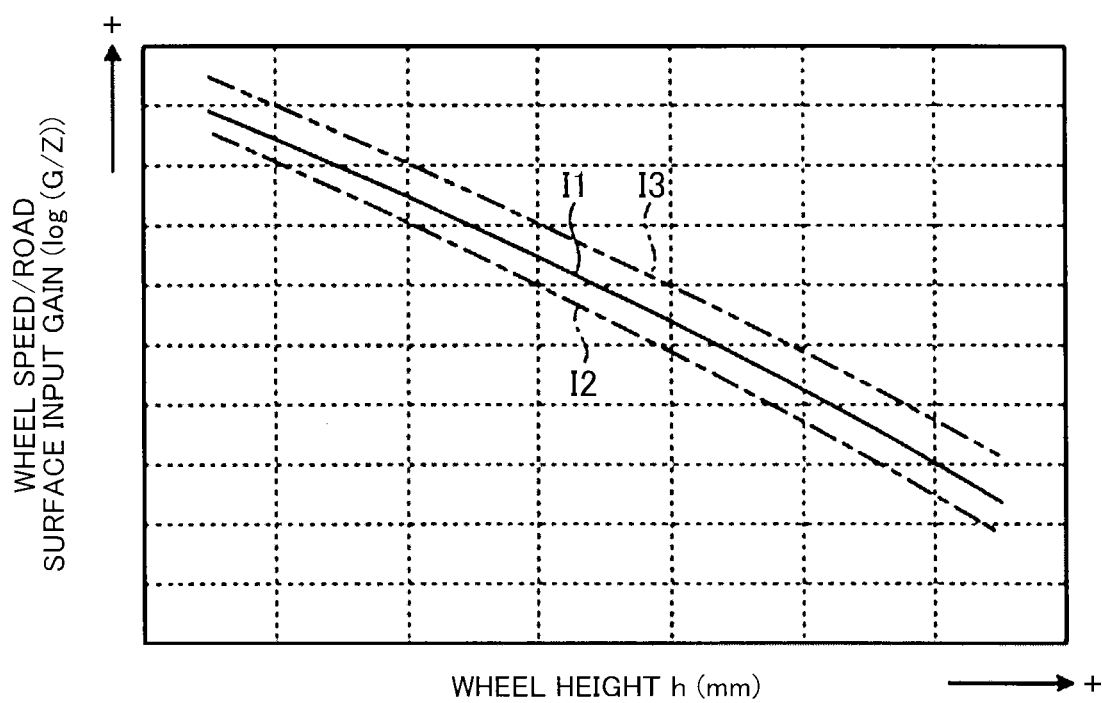
FIG. 16 is a diagram illustrating a relationship between wheel height and wheel speed/road surface input gain at a gain-specific frequency.

FIG. 16 is a diagram illustrating a relationship between wheel height and wheel speed/road surface input gain at a gain-specific frequency. FIG. 12 and FIG. 13 are substantially identical to FIG. 3, but FIG. 3 illustrates an instance of medium damping (damping force at a reference level), whereas FIG. 12 illustrates an instance of small damping (damping force at a minimum level) and FIG. 13 illustrates an instance of large damping (damping force at a maximum level). Likewise, FIG. 14 and FIG. 15 are substantially identical to FIG. 4, but FIG. 4 illustrates an instance of medium damping (damping force at a reference level), whereas FIG. 14 illustrates an instance of small damping (damping force at a minimum level) and FIG. 15 illustrates an instance of large damping (damping force at a maximum level). FIG. 16 is substantially identical to FIG. 5, but illustrates herein a relationship, in accordance with the suspension state, of the front right wheel height $h_{FR}$ and the wheel speed/road surface input gain log $(G_{FR}/Z_{FR})$ of the front right wheel 11FR at the gain characteristic frequency $f_{GF}$ of the front left and right wheels FLR.

Firstly, the vehicle height estimation unit 41 of the ECU 4 acquires the front left wheel speed $V_{FL}$, the front right wheel speed $V_{FR}$, a front left wheel suspension control value $X_{FL}$ and a front right wheel suspension control value $X_{FR}$ (step ST31). Herein, the vehicle height estimation unit 41 acquires not only the front left wheel speed $V_{FL}$ and the front right wheel speed $V_{FR}$ of the front left and right wheels 11FLR, but also the front left wheel suspension control value $X_{FL}$ that is outputted to the front left wheel suspension state modification device 15FL in order to control the suspension state of the front left wheel 11FL, i.e. the damping force of the front left wheel suspension device 13FL, and the front right wheel suspension control value $X_{FR}$ that is outputted to the front right wheel suspension state modification device 15FR in order to control the suspension state of the front right wheel 11FR, i.e. the damping force of the front right wheel suspension device 13FR. To estimate the rear left-right wheel vehicle height difference $\Delta H_{RLR}$, the vehicle height estimation unit 41 acquires not only the rear left wheel speed $V_{RL}$ and the rear right wheel speed $V_{RR}$ of the rear left and right wheels 11RLR, but also a rear left wheel suspension control value $X_{RL}$ that is outputted to the rear left wheel suspension state modification device 15RL in order to control the suspension state of the rear left wheel 11RL, i.e. the damping force of the rear left wheel suspension device 13RL, and a rear right wheel suspension control value $X_{RR}$ that is outputted to the rear right wheel suspension state modification device 15RR in order to control the suspension state of the rear right wheel 11RR, i.e. the damping force of the rear right wheel suspension device 13RR.

Next, the vehicle height estimation unit 41 calculates the front left wheel speed characteristic (log $G_{FL}$) and the front right wheel speed characteristic (log $G_{FR}$) of the front left and right wheels 11FLR at the gain-specific frequency $f_{GF}$ on the basis of the acquired front left wheel speed $V_{FL}$ and front right wheel speed $V_{FR}$ (step ST32). To estimate the rear left-right wheel vehicle height difference $\Delta H_{RLR}$, the vehicle height estimation unit 41 calculates the rear left wheel speed characteristic (log $G_{RL}$) and the rear right wheel speed characteristic (log $G_{RR}$) of the rear left and right wheels 11RLR at the gain-specific frequency $f_{GR}$.

Next, the vehicle height estimation unit 41 calculates the front left-right wheel speed gain difference $\Delta G_F$ on the basis of the calculated front left wheel speed characteristic (log $G_{FL}$) and front right wheel speed characteristic (log $G_{FR}$) (step ST33). To estimate the rear left-right wheel vehicle height difference $\Delta H_{RLR}$, the vehicle height estimation unit 41 calculates the rear left-right wheel speed gain difference $\Delta G_R$ on the basis of the rear left wheel speed characteristic (log $G_{RL}$) and the rear right wheel speed characteristic (log $G_{RR}$).

Next, the vehicle height estimation unit 41 calculates the front left-right wheel vehicle height difference $\Delta H_{FLR}$ on the basis of the calculated front left-right wheel speed gain difference $\Delta G_F$ (step ST34). The vehicle height estimation unit 41 calculates herein the front left-right wheel vehicle height difference $\Delta H_{FLR}$ on the basis of the front left-right wheel speed gain difference $\Delta G_F$ and Expression (17) below. In the expression, $b_{FL}$ is a constant according to the damping force corresponding to the front left wheel 11FL at the gain-specific frequency $f_{GF}$, and $b_{FR}$ is a constant according to the damping force corresponding to the front right wheel 11FR, at the gain-specific frequency $f_{GF}$. To estimate the rear left-right wheel vehicle height difference $\Delta H_{RLR}$ the vehicle height estimation unit 41 calculates the rear left-right wheel vehicle height difference $\Delta H_{RLR}$ on the basis of the rear left-right wheel speed gain difference $\Delta G_R$ and Expression (18) below. In the expression, $b_{RL}$ is a constant according to the damping force corresponding to the front left wheel 11FL at the gain-specific frequency $f_{GF}$, and $b_{RR}$ is a constant according to the damping force corresponding to the front right wheel 11FR at the gain-specific frequency $f_{GF}$.

$$\Delta H_{FLR}=(\Delta G_F-(b_{FL}-b_{FR}))/a_F \quad (17)$$

$$\Delta H_{RLR}=(\Delta G_R-(b_{RL}-b_{RR}))/a_R \quad (18)$$

The reasons why Expressions (17) and (18) allow calculating the front left-right wheel vehicle height difference $\Delta H_{FLR}$ and the rear left-right wheel vehicle height difference $\Delta H_{RLR}$ according to the suspension state will be explained next. The explanation of portions identical to those of Embodiment 1 will be omitted or simplified herein. Wheel speed is affected, and hence the wheel speed/road surface input gain (log $(G_{FR}/Z_{FR})$), i.e. the actual wheel speed gain, is affected as well, by changes in the suspension state of the wheels 11FL to 11RR, i.e. changes in the damping force of the suspension devices 13FL to 13RR by the respective suspension state modification devices 15FL to 15RR. In a case where the damping force of the front right wheel suspension device 13FR is at a minimum level, the position of the gain characteristic lines (A2, B2, C2 in FIG. 12) at the gain-specific frequency $f_{GF}$ is lower, as illustrated in FIG. 12, than that in a case where the damping force is at a reference level. In a case where the damping force of the front right wheel suspension device 13FR is at a maximum level, the position of the gain characteristic lines (A3, B3, C3 in FIG. 13) at the 25 gain-specific frequency $f_{GF}$ is higher, as illustrated in FIG. 13, than that when the damping force is at a reference level. As illustrated in FIG. 14, by contrast, the position of the gain characteristic lines (D2, E2, F2 in FIG. 14) at the gain-specific frequency $f_{GR}$ is higher than that when the damping force is at a reference level, in a case where the damping force of the rear right wheel suspension device 13RR is at a minimum level. As illustrated in FIG. 15, the position of the gain characteristic lines (D3, E3, F3 in FIG. 14) at the gain-specific frequency $f_{GR}$ is lower than that when the damping force is at a reference level, in a case where the damping force of the rear right wheel suspension device 13RR is at a maximum level. That is, the wheel speed/road surface input gain 5 (log G/Z) of the wheels 11FL to 11RR varies not only depending on changes in the wheel height h, but also depending on changes in the suspension state, i.e. changes in the damping force. That is, the transfer relationship between the road surface input and wheel speed of the wheels 11FL to 11RR, i.e. the gain characteristic of wheel speed, is different depending on the suspension state.

In the relationship between the front right wheel height $h_{FR}$ and the front right wheel speed/road surface input gain (log $(G_{FR}/Z_{FR})$) of the front left and right wheels 11FLR at the gain-specific frequency $f_{GF}$, i.e. the actual front right wheel speed characteristic, the front right wheel speed/road surface input gain (log $(G_{FR}/Z_{FR})$) decreases likewise as the front right wheel height $h_{FR}$ increases, as denoted by l1, l2, l3 in FIG. 16; herein, the wheel speed/road surface input gain (log (G/Z)) for a same wheel height decreases in the order l3, l1, l2. That is, the relationship between the wheel height h and the wheel speed/road surface input gain (log (G/Z)) at the gain-specific frequency $f_G$ is such that, as the wheel height h increases and decreases, the wheel speed/road surface input gain (log (G/Z)) increases and decreases likewise, and the wheel speed/road surface input gain (log (G/Z)) is different, for a same wheel height, depending on the suspension state. Therefore, the gain characteristic function is different depending on the suspension state, and hence the constant b is different depending on the damping force. For instance, assuming the damping force at a reference level to be $a \times h + b_1$, then an instance where the damping force is a the minimum level is $a \times h + b_2$ and an instance where the damping force is at a maximum level is $a \times h + b_3$. Herein there holds $b_1 \neq b_2 \neq b_3$ ($b_2 < b_1 < b_3$ for the front left and right wheels 11FLR).

If the damping forces corresponding to the wheels 11FL to 11RR are dissimilar, therefore, the constants $b_F$, $b_R$ in Expressions (4), (5), (6) and (7) above are no longer respective identical values for the front left and right wheels 11FLR and the rear left and right wheels 11RLR, and can be given instead by Expressions (19), (20), (21) and (22) below. In the expressions, $b_{FL}$ is a constant corresponding to the front left wheel 11FL at the gain-specific frequency $f_{GF}$, $b_{FR}$ is a constant corresponding to the front right wheel 11 FR at the gain-specific frequency $f_{GF}$, $b_{RL}$ is a constant corresponding to the rear left wheel 11RL at the gain-specific frequency $f_{GF}$, $b_{RR}$ is a constant corresponding to the rear right wheel 11RR at the gain-specific frequency $f_{GF}$, the constants $b_{FL}$, $b_{FR}$ are any one of $b_1$, $b_2$, $b_3$ of the front left and right wheels 11FLR, and the constants $b_{RL}$, $b_{RR}$ are any one of $b_1$, $b_2$, $b_3$ of the rear left and right wheels 11RLR.

$$\log(G_{FL}/Z_F) = a_F \times h_{FL} + b_{FL} \tag{19}$$

$$\log(G_{FR}/Z_F) = a_F \times h_{FR} + b_{FR} \tag{20}$$

$$\log(G_{RL}/Z_R) = a_R \times h_{RL} + b_{RL} \tag{21}$$

$$\log(G_{RR}/Z_R) = a_R \times h_{RR} + b_{RR} \tag{22}$$

Upon working out the front left-right wheel speed gain difference $\Delta G_F$ on the basis of Expressions (19) and (20) above in the front left and right wheels 11FLR, the influence of the road surface input that is inputted to the front left and right wheels 11FLR can be eliminated as in Expression (23) below. Upon working out the rear left-right wheel speed gain difference $\Delta G_R$ in the rear left and right wheels 11RLR on the basis of the Expression (21) and (22), the influence of the road surface input that is inputted to the rear left and right wheels 11RLR can be similarly removed, as in Expression (24). Expression (17) for calculating the front left-right wheel vehicle height difference $\Delta H_{FLR}$ can be derived from Expressions (10) and (23), and Expression (18) for calculating the rear left-right wheel vehicle height difference $\Delta H_{RLR}$ can be derived from Expressions (11) and (24).

$$\Delta G_F = \log G_{FR} - \log G_{FL} = a_F(h_{FL} - h_{FR}) + b_{FL} - b_{FR} \tag{23}$$

$$\Delta G_R = \log G_{RR} - \log G_{RL} = a_R(h_{RL} - h_{RR}) + b_{RL} - b_{RR} \tag{24}$$

As described above, the vehicle height estimation device 1-3 according to the embodiment can estimate, as the vehicle height, the front left-right wheel vehicle height difference $\Delta H_{FLR}$ that takes into consideration changes in the suspension state of the front left and right wheels in damping force control by the front left-right wheel suspension state modification device, on the basis of a relationship, which differs depending on the suspension state, between the wheel height h and the wheel speed/road surface input gains (log (G/Z)) of the front left and right wheels 11FLR at the gain-specific frequency $f_{GF}$, i.e. the actual wheel speed gain, using, as input parameters, the front left wheel speed $V_{FL}$, the front right wheel speed $V_{FR}$, the front left wheel suspension control value $X_{FL}$ and the front right wheel suspension control value $X_{FR}$ of the pair of front left and right wheels 11FLR. Further, the vehicle height estimation device 1-3 can estimate, as the vehicle height, the rear left-right wheel vehicle height difference $\Delta H_{RLR}$ that takes into consideration changes in the suspension state of the rear left and right wheels in damping force control by the rear left-right wheel suspension state modification device, on the basis of a relationship, which differs depending on the suspension state, between the wheel height h and the wheel speed/road surface input gains (log (G/Z)) of the rear left and right wheels 11RLR at the gain-specific frequency $f_{GR}$, i.e. the actual wheel speed gain, using, as input parameters, the rear left wheel speed $V_{RL}$, the rear right wheel speed $V_{RR}$, the rear left wheel suspension control value $X_{RL}$ and the rear right wheel suspension control value $X_{RR}$ of the pair of rear left and right wheels 11RLR. Accordingly, there is no need for providing a vehicle height sensor for detecting the vehicle height of the wheels 11FL to 11RR, and no new sensor is added in order to estimate vehicle height, even if the suspension states of the wheels 11FL to 11RR are dissimilar, in the case of a vehicle 10 already equipped with the wheel speed sensors 2FL to 2RR and the suspension state modification devices 15FL to 15RR for the purpose of braking control, as represented by ABS, or behavior control, as represented by damping control by AVS. It becomes therefore possible to estimate the vehicle height difference of the left and right wheels in the vehicle 10 inexpensively. Further, the front left-right wheel weight difference $\Delta W_{FLR}$ and rear left-right wheel weight difference $\Delta W_{RLR}$ according to the suspension state can be calculated and estimated, and high-precision control in accordance with the travel state of the vehicle 10 can likewise be carried out, as in the case of Embodiment 1.

Embodiment 4

A vehicle height estimation device according to Embodiment 4 will be explained next. The basic configuration of a vehicle height estimation device 1-4 according to Embodiment 4 is identical to that of the vehicle height estimation device 1-3 according to Embodiment 3, and hence the configuration of the former will not be explained again. The vehicle height estimation unit 41 in the ECU 4 of the vehicle height estimation device 1-4 according to Embodiment 4 estimates, as the vehicle height, the rear right wheel height $h_{RR}$ of a rear wheel in a pair of front and rear wheels, on the basis of the front right wheel speed $V_{FR}$ and the rear right wheel speed $V_{RR}$ of the right front and rear wheels 11RFR and on the basis of a corresponding relationship between the wheel height h and a value that is based on wheel speed and on the road surface input and that differs depending on the suspension state (damping force).

Figure 17:
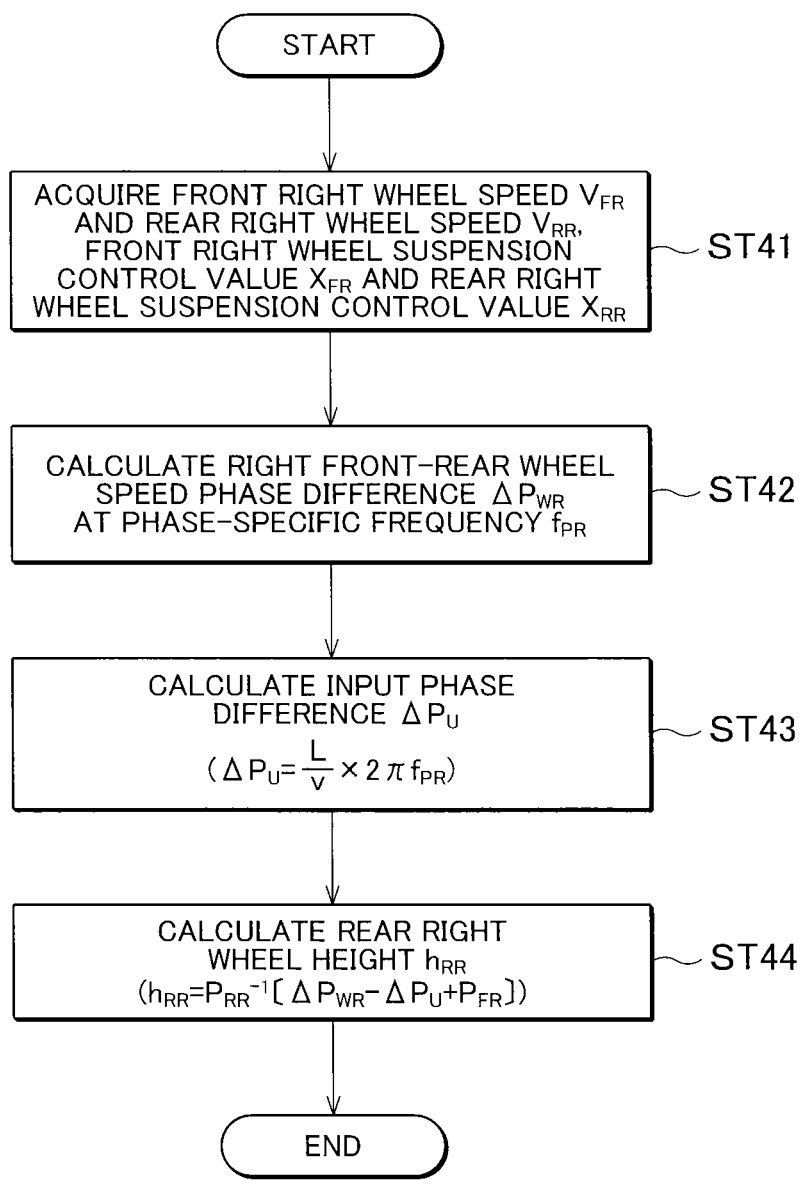
FIG. 17 is a flow diagram illustrating a vehicle height estimation method by the vehicle height estimation device according to Embodiment 4.
Figure 18:
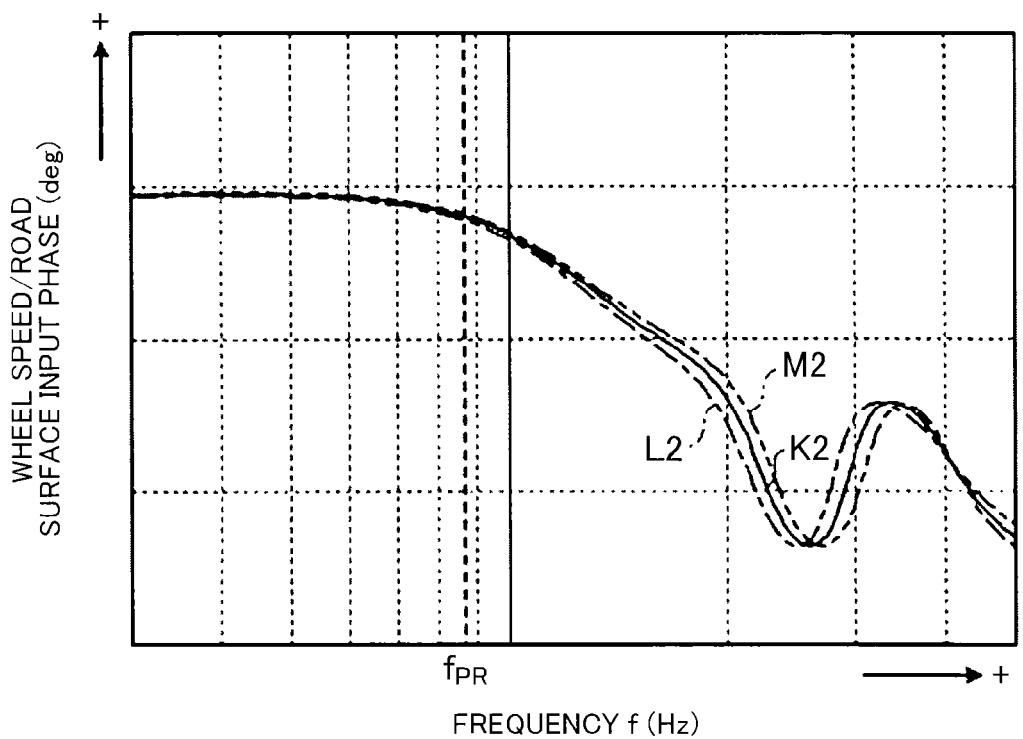
FIG. 18 is a diagram illustrating a relationship (small damping) between wheel speed/road surface input phase, frequency and wheel height in a front wheel.
Figure 19:
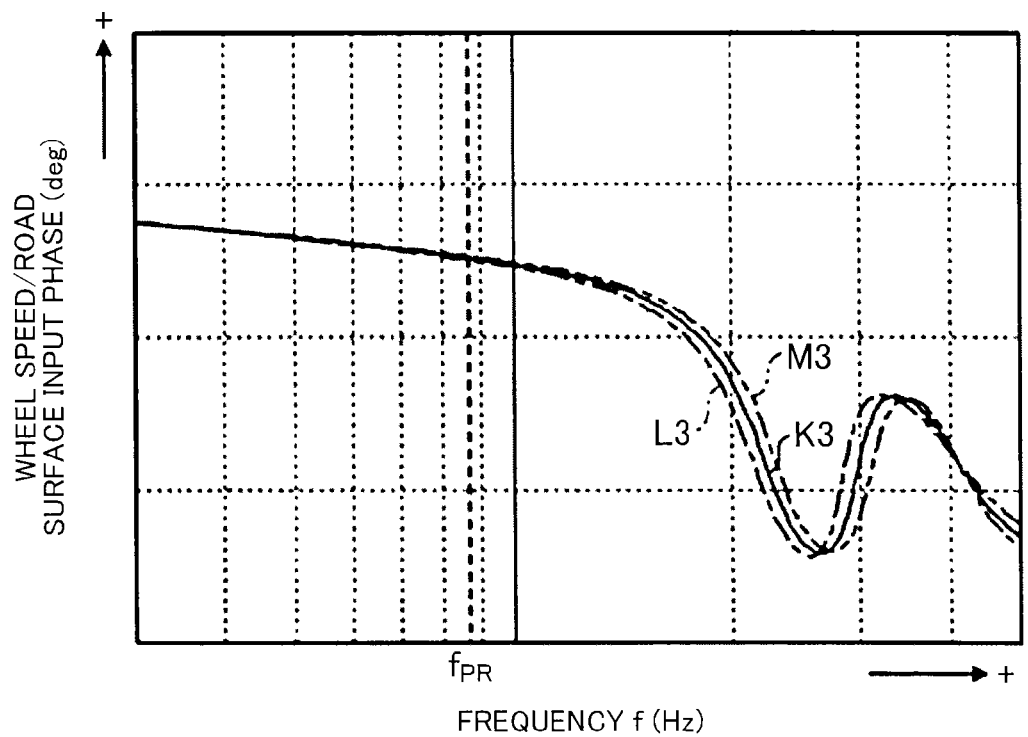
FIG. 19 is a diagram illustrating a relationship (large damping) between wheel speed/road surface input phase, frequency and wheel height in a front wheel.
Figure 20:
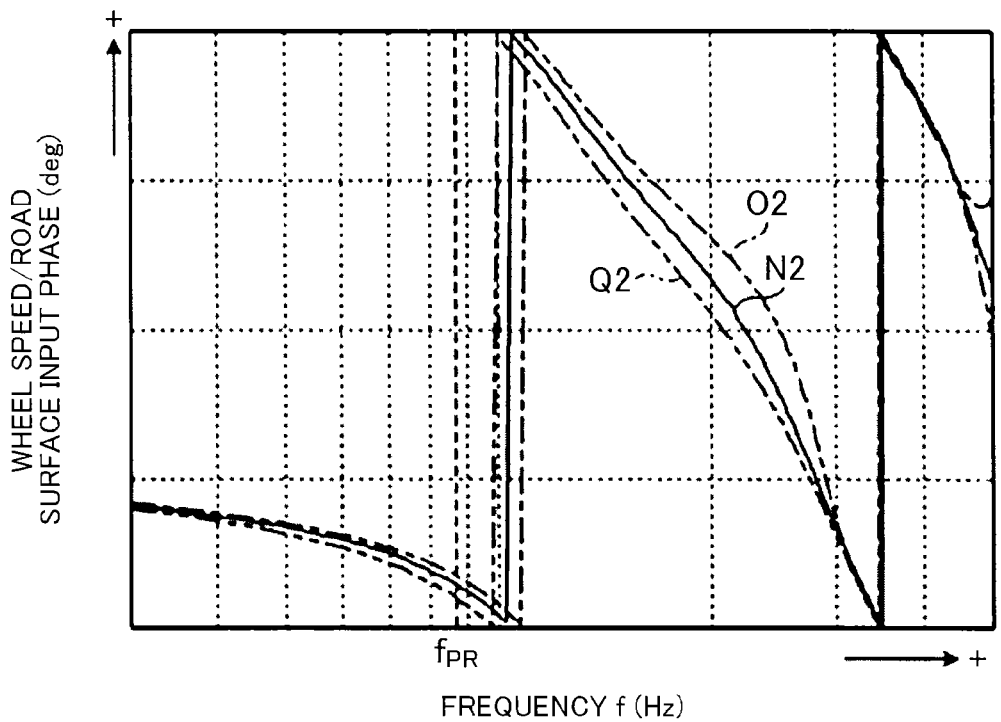
FIG. 20 is a diagram illustrating a relationship (small damping) between wheel speed/road surface input phase, frequency and wheel height in a rear wheel.
Figure 21:
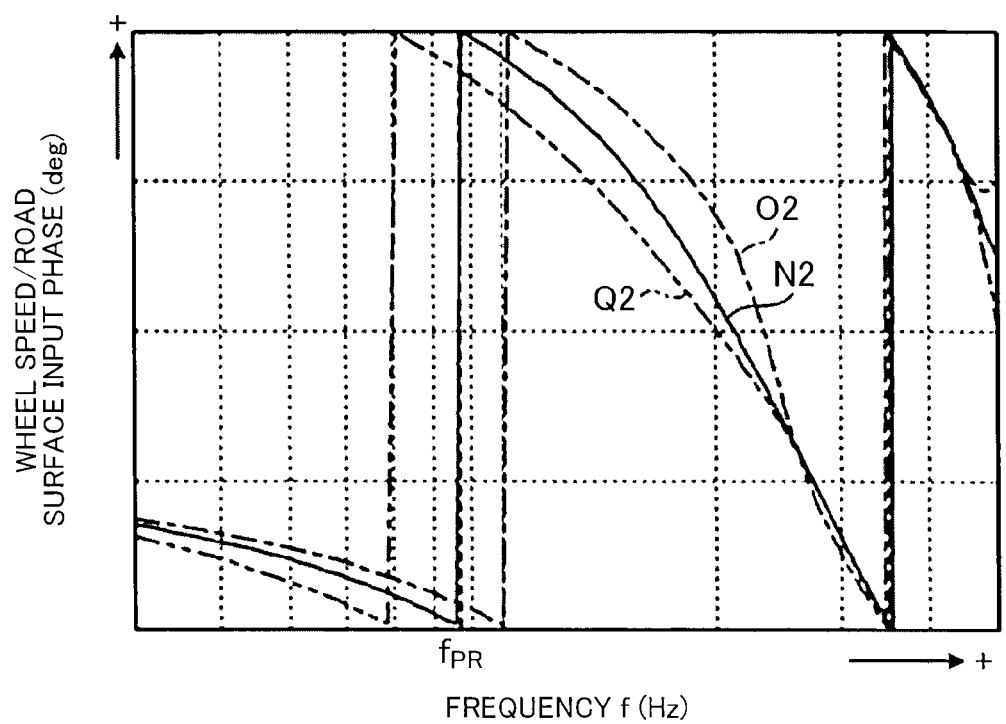
FIG. 21 is a diagram illustrating a relationship (large damping) between wheel speed/road surface input phase, frequency and wheel height in a rear wheel.
Figure 22:
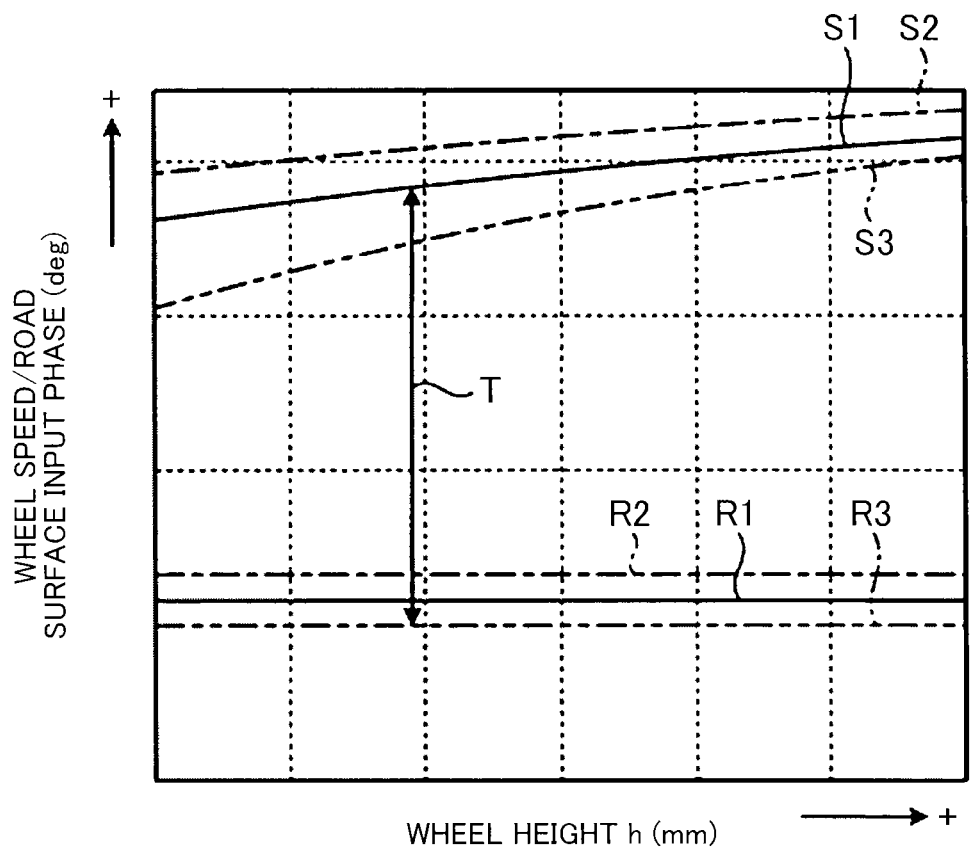
FIG. 22 is a diagram illustrating a relationship between wheel height and wheel speed/road surface input phase at a phase-specific frequency.

A vehicle height estimation method by the vehicle height estimation device 1-4 according to Embodiment 4 will be explained next. The basic steps of the vehicle height estimation method by the vehicle height estimation device 1-4 according to Embodiment 4 are substantially identical to the steps of the vehicle height estimation method by the vehicle height estimation device 1-2 according to Embodiment 2, and hence an explanation thereof will be omitted or simplified. FIG. 17 is a flow diagram illustrating the vehicle height estimation method by the vehicle height estimation device according to Embodiment 4. FIG. 18 is a diagram illustrating a relationship (small damping) between wheel speed/road surface input phase, frequency and wheel height in a front wheel. FIG. 19 is a diagram illustrating a relationship (large damping) between wheel speed/road surface input phase, frequency and wheel height in a front wheel. FIG. 20 is a diagram illustrating a relationship (small damping) between wheel speed/road surface input phase, frequency and wheel height in a rear wheel. FIG. 21 is a diagram illustrating a relationship (large damping) between wheel speed/road surface input phase, frequency and wheel height in a rear wheel. FIG. 22 is a diagram illustrating a relationship between wheel height and wheel speed/road surface input phase at a phase-specific frequency. FIG. 18 and FIG. 19 are substantially identical to FIG. 7, but FIG. 7 illustrates an instance of medium damping (damping force at a reference level), whereas FIG. 18 illustrates an instance of small damping (damping force at a minimum level) and FIG. 19 illustrates an instance of large damping (damping force at a maximum level). Likewise, FIG. 20 and FIG. 21 are substantially identical to FIG. 8, but FIG. 8 illustrates an instance of medium damping (damping force at a reference level), whereas FIG. 20 illustrates an instance of small damping (damping force at a minimum level) and FIG. 21 illustrates an instance of large damping (damping force at a maximum level). FIG. 22 is substantially identical to FIG. 9, but illustrates herein a relationship, in accordance with the suspension state, of the front right wheel height $h_{FR}$ and the wheel speed/road surface input gain log ($G_{FR}/Z_{FR}$) of the front right wheel 11FR at the gain characteristic frequency $f_{GF}$, of the front left and right wheels FLR.

Firstly, the vehicle height estimation unit 41 of the ECU 4 acquires the front right wheel speed $V_{FR}$, the rear right wheel speed $V_{RR}$, the front right wheel suspension control value $X_{FR}$ and the rear right wheel suspension control value $X_{RR}$ (step ST41). Herein the vehicle height estimation unit 41 acquires not only the front right wheel speed $V_{FR}$ and the rear right wheel speed $V_{RR}$ of the right front and rear wheels 11RFR but also the front right wheel suspension control value $X_{FR}$ that is outputted to the front right wheel suspension state modification device 15FR in order to control the suspension state of the front right wheel 11 FR, i.e. the damping force of the front right wheel suspension device 13FR, and the rear right wheel suspension control value $X_{RR}$ that is outputted to the rear right wheel suspension state modification device 15RR in order to control the suspension state of the rear right wheel 11RR, i.e. the damping force of the rear right wheel suspension device 13RR.

Next, the vehicle height estimation unit 41 calculates the right front-rear wheel speed phase difference $\Delta P_{WR}$ of the right front and rear wheels 11RFR at the phase-specific frequency $f_{PR}$ on the basis of the acquired front right wheel speed $V_{FR}$ and rear right wheel speed $V_{RR}$ (step ST42). Next, the vehicle height estimation unit 41 calculates the input phase difference $\Delta P_U$ (step ST43).

Next, the vehicle height estimation unit 41 calculates the rear right wheel height $h_{RR}$ on the basis of the calculated right front-rear wheel speed phase difference $\Delta P_{WR}$ and the input phase difference $\Delta P_U$ (step ST44). The vehicle height estimation unit 41 calculates the rear right wheel height $h_{RR}$ on the basis of the right front-rear wheel speed phase difference $\Delta P_{WR}$, the input phase difference $\Delta P_U$ and Expression (25) below. Herein, $P_{RR}(h)$ is a rear wheel phase characteristic function of the rear right wheel 11RR according to the damping force, and $P_{FR}$ is the result of the front wheel phase characteristic function ($P_{FR}=P_{FR}(h)$) of the front right wheel 11FR according to the damping force.

$$h_{RR}=P_{RR}^{-1}(\Delta P_{WR}-\Delta P_U+P_{FR}) \qquad (25)$$

The reason why the rear right wheel height $h_{RR}$ can be calculated on the basis of Expression (25) will be explained next. The explanation of portions identical to those of Embodiment 2 will be omitted or simplified herein. Wheel speed is affected, and the wheel speed/road surface input phase, i.e. the actual wheel speed phase, is affected as well, by changes in the suspension state of the wheels 11FL to 11RR, i.e. changes in the damping force of the suspension devices 13FL to 13RR by the respective suspension state modification devices 15FL to 15RR. As illustrated in FIG. 18, in a case where the damping force of the front right wheel suspension device 13FR is at a minimum level, the position of the phase characteristic lines (K2, L2, M2 in the figure) at the phase-specific frequency $f_{PR}$ is lower than that when the damping force is at a reference level. As illustrated in FIG. 19, in a case where the damping force of the front 20 right wheel suspension device 13FR is at a maximum level, the position of the phase characteristic lines (K3, L3, M3 in the figure) at the phase-specific frequency $f_{PR}$ is higher than that when the damping force is at a reference level. On the other hand, as illustrated in FIG. 20, in a case where the damping force of the rear right wheel suspension device 13RR is at a minimum level, the position of the phase characteristic lines (N2, O2, Q2 in the figure) at the phase-specific frequency $f_{PR}$ is higher than that when the damping force is at the reference level. As illustrated in FIG. 21, in a case where the damping force of the rear right wheel suspension device 13RR is at a maximum level, the position of the phase characteristic lines (N3, OS, Q3 in the figure) at the phase-specific frequency $f_{PR}$ is lower than that when the damping force is at the reference level. That is, the wheel speed/road surface input phase of the wheels 11 FL to 11 RR varies not only depending on changes in the wheel height h, but also depending on changes in the suspension state, i.e. changes in the damping force. That is, the transfer relationship between the road surface input and wheel speed of the wheels 11FL to 11RR, i.e. the phase characteristic of wheel speed, is different depending on the suspension state.

As denoted by R1, R2, R3 in FIG. 22, the relationship between the front right wheel height $h_{FR}$ and the front right wheel speed/road surface input phase of the right front and rear wheels 11RFR at the phase-specific frequency $f_{PR}$, i.e. the actual front right wheel speed phase, is constant, regardless of changes in the front right wheel height $h_{FR}$, and takes on smaller values in the order R2, R1, R3. That is, the result of the front wheel phase characteristic function at the phase-specific frequency $fp_R$ is constant, but takes on a different value depending on the suspension state. Assuming the damping force at the reference level to yield $P_{F1}=P_{F1}(h)$, then the damping force at the minimum level yields $P_{F2}=P_{F2}(h)$ and the damping force at the maximum level yields $P_{F3}=P_{F3}(h)$. Herein there holds $P_{F2}>P_{F1}>P_{F3}$.

On the other hand, the relationship between the rear right wheel height $h_{RR}$ and the rear right wheel speed/road surface input phase of the right front and rear wheels 11RFR at the phase-specific frequency $f_{PR}$, i.e. the actual rear right wheel speed phase, is such that the rear right wheel speed/road surface input phase increases as the rear right wheel height $h_{RR}$ increases, as denoted by S1, S2, S3 in the figure. The wheel speed/road surface input phase for a same wheel height takes on smaller values in the order S2, S1, S3. That is, the rear wheel phase characteristic function at the phase-specific frequency $f_{PR}$ is different depending on the suspension state. Assuming the damping force at the reference level to yield $P_{R1}=P_{F1}(h)$, then the damping force at the minimum level yields $P_{F2}=P_{F2}(h)$ and the damping force at the maximum level yields $P_{F3}=P_{F3}(h)$. Herein there holds $P_{R2}>P_{R1}>P_{R3}$.

The front wheel phase characteristic function ($P_{FR}=P_{FR}(h)$) and the rear wheel phase characteristic function ($P_{RR}=P_{RR}(h)$) of the right front and rear wheels 11RFR differ depending on the suspension state. Accordingly, the transfer function ($\Delta P_M(h)$) of the front and rear wheel speed varies depending on the suspension state. For instance, the transfer function of the front and rear wheel speed is represented by Expression (26) below in a case where the damping force corresponding to the rear right wheel 11RR is at a maximum level, with the damping force of the front right wheel 11FR at the reference level, as denoted by T in FIG. 22.

$$\Delta P_M(h)=P_{RR}(h)-P_{FR}=P_{R3}(h)-P_{F1} \quad (26)$$

Therefore, the value that results from subtracting the input phase difference $\Delta P_U$ from the right front-rear wheel speed phase difference $\Delta P_{wR}$ and the result of the transfer function ($\Delta P_M(h)$) of the front and rear wheel speed are identical, and hence Expression (25) can be derived from Expression (27) below.

$$P_{RR}(h)-P_{FR}=\Delta P_{WR}-\Delta P_U \quad (27)$$

As explained above, the vehicle height estimation device 1-4 according to the embodiment can estimate, as the vehicle height, the rear right wheel height $h_{RR}$ that takes into consideration changes in the suspension state of the right front and rear wheels, on the basis of a relationship, which differs depending on the suspension state, between the wheel height h and the wheel speed/road surface input phase of the right front and rear wheels 11RFR at the phase-specific frequency $f_{PR}$, i.e. the actual wheel speed phase, using, as input parameters, the front right wheel speed $V_{FR}$, the rear right wheel speed $V_{RR}$, the front right wheel suspension control value $X_{FR}$ and the rear right wheel suspension control value $X_{RR}$ of the pair of right front and rear wheels 11RFR. Accordingly, there is no need for a vehicle height sensor that detects the vehicle height of the wheels 11FL to 11RR, and the vehicle height of the rear wheels of the vehicle 10 can be estimated inexpensively, as in the case of Embodiment 2.

The vehicle height estimation device 1-4 can estimate, as the vehicle height, the rear left wheel height $h_{RL}$ on the basis of a relationship between the wheel height h and the wheel speed/road surface input phase of the front left and rear wheels 11LFR at the phase-specific frequency $f_{PL}$, i.e. the actual wheel speed phase, using, as input parameters, the front left wheel speed $V_{FL}$, the rear left wheel speed $V_{RL}$, the front left wheel suspension control value $X_{FL}$ and the rear left wheel suspension control value $X_{RL}$ of the front left and rear wheels 11LFR. It becomes therefore possible to estimate the rear left-right wheel vehicle height difference $\Delta H_{RLR}$ and calculate and estimate the rear left-right wheel weight difference $\Delta W_{RLR}$. High-precision control in accordance with the travel state of the vehicle 10 is enabled thus, as in the case of Embodiment 2.

In Embodiments 3 and 4, modifications of the damping force are utilized as modifications of the suspension state, but the embodiments are not limited thereto, and modifications of wheel height by a vehicle height adjustment device, or modifications of the rigidity of a stabilizer by an active stabilizer system can be resorted to instead.

Vehicle height estimation is performed when there is a predetermined input from the road surface.

In Embodiments 1 and 4, vehicle height estimation by the vehicle height estimation unit 41 may be executed if a specific road surface input acts on the wheels 11FL to 11RR. The value of unsprung vertical acceleration is influenced by the road surface input, and hence vehicle height estimation by the vehicle height estimation unit 41 may be executed upon determination that a specific surface input has occurred as a result of a determination of whether or not a specific road surface input has taken place, on the basis of a value detected by an unsprung vertical acceleration sensor (for instance, a sensor mounted on an electromagnetic suspension) that is provided in the vehicle 10, and that is capable of detecting vertical acceleration, closer to the wheels 11FL to 11RR than the suspension devices 13FL to 13RR. Herein, the term specific road surface input refers to a road surface input in a situation of significant change in wheel height h. As a result, the behavior of the vehicle 10 can be reliably controlled based on vehicle height estimation, and the calculation load of a support ECU 8 can be reduced, when the wheel height h varies significantly, i.e. when the behavior of the vehicle 10 is not stable, by actively performing vehicle height estimation upon significant changes in the wheel height h.

1-1 to 1-4 vehicle height estimation device
2FL, 2FR, 2RL, 2RR wheel speed sensor
3 vehicle speed sensor
4 ECU
41 vehicle height estimation unit
5 engine ECU
6 brake ECU
7 steering ECU
10 vehicle
11FL front left wheel
11FR front right wheel
11RL rear left wheel
11RR rear right wheel
12FL, 12FR, 12RL, 12RR drive shaft
13FL, 13FR, 13RL, 13RR suspension device
14 body
15FL, 15FR, 15RL, 15RR suspension state modification device

The invention claimed is:

1. A vehicle height estimation device, comprising:
a wheel speed detection sensor that detects a wheel speed, which is a speed of each wheel; and
a vehicle height estimation control circuitry that estimates a vehicle height on the basis of a corresponding relationship between a wheel height of said wheel with respect to a vehicle body and a value that is based on said wheel speed and a road surface input that is inputted from a road surface to said wheel, and on the basis of said detected wheel speed of a pair of wheels;
wherein said vehicle height estimation control circuitry performs frequency analysis of said detected wheel speed of a pair of left and right wheels and calculates respective wheel speed characteristics of said left and right wheels at a gain-specific frequency; and
estimates, as said vehicle height, a relative height of one of said left and right wheels with respect to the other one of said left and right wheels on the basis of a left-right wheel speed gain difference, which is a difference between said calculated wheel speed characteristics, and a relationship, which is said corresponding relationship, between said wheel height and an actual wheel speed gain that is based on said road surface input and said wheel speed at said gain-specific frequency.

2. The vehicle height estimation device according to claim 1, further comprising:
- a vehicle speed detection sensor that detects a vehicle speed of the vehicle;
- wherein said vehicle height estimation control circuitry performs frequency analysis of said detected wheel speed of a pair of front and rear wheels and calculates a front and rear wheel phase difference at a phase-specific frequency;
- on the basis of said detected vehicle speed, calculates an input phase difference which is a phase difference between inputs of said front wheel and said rear wheel; and
- calculates, as said vehicle height, a wheel height of said rear wheel on the basis of said calculated front and rear wheel phase difference, said input phase difference, and a relationship, which is said corresponding relationship, between said wheel height and an actual wheel speed phase that is based on said road surface input and said wheel speed at said phase-specific frequency.

3. The vehicle height estimation device according to claim 1, further comprising:
- a suspension state modification device that modifies a suspension state of each said wheel with respect to said vehicle body;
- wherein said corresponding relationship is different depending on said suspension state of each wheel; and
- said vehicle height estimation control circuitry estimates said vehicle height on the basis of said corresponding relationship according to said suspension state.

4. A vehicle height estimation method, comprising: detecting a wheel speed using a wheel speed detection sensor, which is a speed of each wheel;
- estimating using vehicle height estimation control circuitry a vehicle height on the basis of a corresponding relationship between a wheel height of said wheel with respect to a vehicle body and a value that is based on said wheel speed and a road surface input that is inputted from a road surface to said wheel, and on the basis of said detected wheel speed of a pair of wheels; and
- performing using the vehicle height estimation control circuitry frequency analysis of said detected wheel speed of a pair of left and right wheels and calculating respective wheel speed characteristics of said left and right wheels at a gain-specific frequency;
- wherein the estimating said vehicle height includes estimating, as said vehicle height, a relative height of one of said left and right wheels with respect to the other one of said left and right wheels on the basis of a left-right wheel speed gain difference, which is a difference between said calculated wheel speed characteristics, and a relationship, which is said corresponding relationship, between said wheel height and an actual wheel speed gain that is based on said road surface input and said wheel speed at said gain-specific frequency.

5. The vehicle height estimation method according to claim 4, further comprising:
- detecting a vehicle speed of said vehicle;
- performing frequency analysis of said detected wheel speed of a pair of front and rear wheels and calculating a front and rear wheel phase difference at a phase-specific frequency; and, on the basis of said detected vehicle speed, calculating an input phase difference, which is a phase difference between inputs of said front wheel and said rear wheel,
- wherein the estimating said vehicle height includes calculating, as said vehicle height, a wheel height of said rear wheel on the basis of said calculated front and rear wheel phase difference, said input phase difference, and a relationship, which is said corresponding relationship, between said wheel height and an actual wheel speed phase that is based on said road surface input and said wheel speed at said phase-specific frequency.

6. The vehicle height estimation method according to claim 4,
- wherein said corresponding relationship differs depending on a suspension state of each wheel with respect to said vehicle body, with this state being modified by a suspension state modification device; and
- in said estimating said vehicle height, said vehicle height is estimated on the basis of said corresponding relationship according to said suspension state.

* * * * *